US012056611B2

(12) United States Patent
Du et al.

(10) Patent No.: US 12,056,611 B2
(45) Date of Patent: Aug. 6, 2024

(54) USE OF A CONVOLUTIONAL NEURAL NETWORK TO AUTO-DETERMINE A FLOOR HEIGHT AND FLOOR HEIGHT ELEVATION OF A BUILDING

(71) Applicant: Corelogic Solutions, LLC, Irvine, CA (US)

(72) Inventors: Wei Du, Springfield, VA (US); David Frederick Smith, Oakland, CA (US); Taylor Bryant Brown, Euless, TX (US)

(73) Assignee: CORELOGIC SOLUTIONS, LLC, Irvine, CA (US)

( * ) Notice: Subject to any disclaimer, the term of this patent is extended or adjusted under 35 U.S.C. 154(b) by 0 days.

(21) Appl. No.: 18/075,448

(22) Filed: Dec. 6, 2022

(65) Prior Publication Data
US 2023/0100515 A1    Mar. 30, 2023

Related U.S. Application Data

(63) Continuation of application No. 16/864,342, filed on May 1, 2020, now Pat. No. 11,555,701.
(Continued)

(51) Int. Cl.
*G06N 3/08*          (2023.01)
*G01C 5/00*          (2006.01)
(Continued)

(52) U.S. Cl.
CPC ............... *G06N 3/08* (2013.01); *G01C 5/00* (2013.01); *G01C 15/002* (2013.01); *G06N 3/04* (2013.01);
(Continued)

(58) Field of Classification Search
CPC ............ G06N 3/08; G06N 3/04; G06N 3/045; G01C 5/00; G01C 15/002; G06V 10/764;
(Continued)

(56) References Cited

U.S. PATENT DOCUMENTS 8,655,595 B1     2/2014   Green et al.
8,682,079 B1 *  3/2014   Ouzounis ............. G06V 10/454
                                                     382/173
(Continued)

FOREIGN PATENT DOCUMENTS

WO         2014/129966 A1     8/2014

OTHER PUBLICATIONS

H. Nakahara, T. Fujii and S. Sato, "A fully connected layer elimination for a binarized convolutional neural network on an FPGA," 2017 27th International Conference on Field Programmable Logic and Applications (FPL), 2017, pp. 1-4, doi: 10.23919/FPL.2017.8056771. (Year: 2017).

*Primary Examiner* — Marnie A Matt
(74) *Attorney, Agent, or Firm* — XSENSUS LLP

(57) ABSTRACT

A system, apparatus, computer program product, and method use a convolutional neural network to auto-determine a first floor height (FFH) and a FFH elevation (FFE) of a building. The FFH, and FFE of the building are determined with respect to the terrain or surface of the parcel of land on which the building is located. In turn, by knowing the FFH and/or FFE of the building on the parcel, it is possible to use that information while performing a flood risk assessment to a property without requiring a personal inspection of the parcel by a human.

20 Claims, 59 Drawing Sheets
(38 of 59 Drawing Sheet(s) Filed in Color)

Related U.S. Application Data

(60) Provisional application No. 62/842,023, filed on May 2, 2019.

(51) Int. Cl.
*G01C 15/00* (2006.01)
*G06N 3/04* (2023.01)
*G06V 10/764* (2022.01)
*G06V 10/82* (2022.01)
*G06V 20/10* (2022.01)
*G06V 20/20* (2022.01)

(52) U.S. Cl.
CPC ............ *G06V 10/764* (2022.01); *G06V 10/82* (2022.01); *G06V 20/10* (2022.01); *G06V 20/176* (2022.01); *G06V 20/20* (2022.01)

(58) Field of Classification Search
CPC ...... G06V 10/82; G06V 20/10; G06V 20/176; G06V 20/20; Y02A 10/40; G06F 18/2413
USPC .......................................................... 382/106
See application file for complete search history.

(56) References Cited

U.S. PATENT DOCUMENTS

| | | | |
|---|---|---|---|
| 9,639,757 | B2 | 5/2017 | Du et al. |
| 10,438,082 | B1 | 10/2019 | Kim et al. |
| 11,120,557 | B1 | 9/2021 | Klose |
| 2012/0259550 | A1 | 10/2012 | Du |
| 2013/0077819 | A1* | 3/2013 | Du ................. G06V 20/176 382/103 |
| 2013/0121571 | A1 | 5/2013 | Gokturk et al. |
| 2013/0197807 | A1* | 8/2013 | Du ................... G06Q 40/08 702/5 |
| 2015/0347872 | A1 | 12/2015 | Taylor et al. |
| 2016/0026900 | A1 | 1/2016 | Ando |
| 2017/0076438 | A1 | 3/2017 | Kottenstette et al. |
| 2018/0165616 | A1 | 6/2018 | Sun et al. |
| 2018/0247416 | A1 | 8/2018 | Ruda et al. |
| 2019/0025062 | A1 | 1/2019 | Young et al. |
| 2020/0348132 | A1* | 11/2020 | Du ..................... G06N 3/045 |
| 2021/0110564 | A1 | 4/2021 | Mantey et al. |

\* cited by examiner

| ELEVATION OF LOWEST FLOOR ABOVE OR BELOW THE BFE[,3] | LOWEST FLOOR ONLY - ABOVE GROUND LEVEL No Basement/Enclosure/Crawlspace[4] | | LOWEST FLOOR ABOVE GROUND LEVEL & HIGHER FLOORS No Basement/Enclosure/Crawlspace[4] | | MORE THAN 1 FLOOR With Basement/Enclosure/Crawlspace[4] | | MANUFACTURED (MOBILE) HOME[4,7] | |
|---|---|---|---|---|---|---|---|---|
| | Residential | Non-Residential Business, Other Non-Residential[8] | Residential | Non-Residential Business, Other Non-Residential[8] | Residential | Non-Residential Business, Other Non-Residential[8] | Single Family | Non-Residential Business, Other Non-Residential[8] |
| +4 | .38 / .12 | .22 / .12 | .38 / .12 | .22 / .12 | .38 / .12 | .22 / .12 | .38 / .12 | .23 / .12 |
| +3 | .38 / .12 | .22 / .12 | .38 / .12 | .22 / .12 | .38 / .12 | .22 / .12 | .38 / .12 | .26 / .13 |
| +2 | .38 / .12 | .24 / .12 | .38 / .12 | .22 / .12 | .38 / .12 | .22 / .12 | .38 / .15 | .36 / .18 |
| +1 | .48 / .12 | .42 / .12 | .38 / .12 | .31 / .12 | .38 / .12 | .22 / .12 | .84 / .23 | .62 / .27 |
| 0 | .95 / .12 | .79 / .12 | .89 / .12 | .60 / .12 | .38 / .12 | .22 / .12 | 1.23 / .37 | 1.18 / .41 |
| -1 | 1.93 / .16 | 1.75 / .13 | 1.47 / .13 | 1.14 / .30 | .56 / .12 | .22 / .12 | 2.70 / .45 | 2.50 / .62 |
| -2 | 3.42 / .12 | 2.63 / .21 | 2.53 / .12 | 2.18 / .12 | *** | *** | 4.47 / .88 | 4.18 / .91 |
| -3 | 4.54 / .12 | 3.94 / .12 | 3.39 / .12 | 2.94 / .12 | *** | *** | 6.15 / 1.52 | 5.85 / 1.63 |
| -4 | 5.80 / .18 | 5.05 / .12 | 4.39 / .12 | 3.82 / .12 | *** | *** | 7.91 / 2.34 | 7.63 / 2.56 |
| -5 | 6.91 / .29 | 6.04 / .19 | 5.32 / .17 | 4.66 / .12 | *** | *** | 9.35 / 3.21 | 9.11 / 3.57 |
| -6 | 7.58 / .47 | 6.69 / .31 | 6.00 / .28 | 5.29 / .16 | *** | *** | 10.04 / 3.90 | 9.80 / 4.53 |
| -7 | 8.15 / .66 | 7.27 / .46 | 6.58 / .42 | 5.85 / .23 | *** | *** | 10.60 / 4.63 | 10.52 / 5.33 |
| -8 | 8.50 / .86 | 7.75 / .64 | 7.07 / .58 | 6.35 / .35 | *** | *** | 10.97 / 5.15 | 10.94 / 5.99 |
| -9 | 8.62 / 1.06 | 8.04 / .81 | 7.38 / .74 | 6.70 / .47 | *** | *** | 11.06 / 5.51 | 11.08 / 6.48 |
| -10 | 8.89 / 1.24 | 8.10 / .98 | 7.56 / .90 | 6.94 / .60 | *** | *** | 11.15 / 5.71 | 11.23 / 6.80 |
| -11 | 9.20 / 1.47 | 8.64 / 1.19 | 8.02 / 1.09 | 7.44 / .75 | *** | *** | 11.26 / 6.30 | 11.38 / 7.51 |
| -12 | 9.60 / 1.66 | 9.00 / 1.35 | 8.38 / 1.25 | 7.83 / .88 | *** | *** | 11.49 / 6.67 | 11.64 / 8.00 |
| -13 | 9.79 / 1.78 | 9.23 / 1.48 | 8.60 / 1.37 | 8.08 / .99 | *** | *** | 11.65 / 6.89 | 11.82 / 8.28 |
| -14 | 10.01 / 1.94 | 9.50 / 1.62 | 8.88 / 1.50 | 8.39 / 1.11 | *** | *** | 11.78 / 7.19 | 11.99 / 8.67 |
| -15 | 10.32 / 2.08 | 9.82 / 1.76 | 9.19 / 1.63 | 8.73 / 1.21 | *** | *** | 12.06 / 7.49 | 12.28 / 9.05 |
| -16 | *** | *** | *** | *** | *** | *** | *** | *** |

| Year | Events exceeded 1,000 yr. rainfall | Duration for Analysis | Year | Events exceeded 1,000 yr. rainfall | Duration for Analysis |
|---|---|---|---|---|---|
| 2018 | Hurricane Florence, 13-18 September 2018 | 72-hour | 2015 | Central Texas, 23-24 May 2015 | 3-hour, 6-hour |
| 2018 | Michigan and Wisconsin, 14-18 June 2018 | 6-hour, 24-hour, 72-hour | 2015 | Oklahoma, April - June 2015 | 20-day, 30-day, 60-day |
| 2018 | Ellicott City, Maryland, 27 May 2018 | 3-hour | 2014 | Phoenix, Arizona, 19 August 2014 | 12-hour |
| 2017 | Hurricane Maria, 20 September 2017 | 12-hour | 2014 | Islip, New York, 13 August 2014 | 3-hour |
| 2017 | Hurricane Harvey, 25-31 August 2017 | 4-day | 2014 | Pensacola, Florida, 29-30 April 2014 | 6-hour |
| 2017 | Missouri, 28 April - 2 May 2017 | 48-hour | 2013 | New Mexico, 9-16 September 2013 | 7-day |
| 2016 | Hurricane Matthew, 6-10 October 2016 | 12-hour | 2013 | Colorado, 9-16 September 2013 | 24-hour, 48-hour, 7-day |
| 2016 | Louisiana, 11-13 August 2016 | 48-hour | 2013 | Southern Missouri, 29 July - 8 August 2013 | 10-day |
| 2016 | Ellicott City, Maryland, 30 July 2016 | 3-hour | 2013 | San Antonio, Texas, 25 May 2013 | 6-hour |
| 2016 | Northern Wisconsin, 11-12 July 2016 | 6-hour | 2013 | Oklahoma City region, 31 May - 1 June 2013 | 4-hour, 6-hour |
| 2016 | West Virginia, 23-24 June 2016 | 24-hour | 2012 | Tropical storm Debby, 24-27 June 2012 | 48-hour |
| 2016 | Lower Mississippi River Valley, 8-12 March 2016 | 48-hour | 2012 | Duluth, Minnesota, 19-20 June 2012 | 24-hour |
| 2015 | Corsicana, Texas, 24-25 October 2015 | 24-hour | 2010 | Tennessee, 1-2 May 2010 | 48-hour |
| 2015 | Austin, Texas, 30 October 2015 | 3-hour, 6-hour | 2010 | Southeastern New England, March 2010 | 20-day |
| 2015 | South Carolina, 2 - 4 October 2015 | 24-hour, 72-hour | | | |

Fig. 5

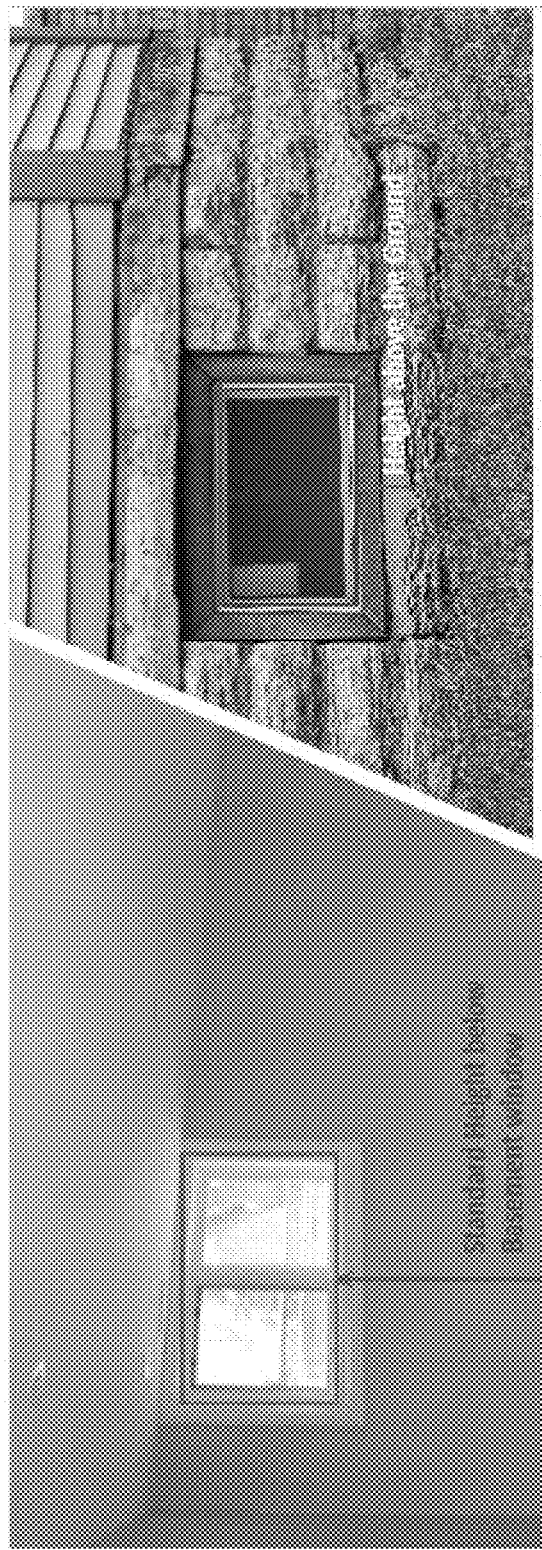
Fig. 32C
Fig. 32A
Fig. 32B

| Code | Description | Code | Description |
|---|---|---|---|
| 002 | UNDEFINED TYPE - 2 CAR GARAGE | 110 | BASEMENT GARAGE |
| 003 | UNDEFINED TYPE - 3 CAR GARAGE | 111 | BASEMENT - 1 CAR GARAGE |
| 004 | UNDEFINED TYPE - 4 CAR GARAGE | 112 | BASEMENT - 2 CAR GARAGE |
| 005 | UNDEFINED TYPE - 5 CAR GARAGE | 113 | BASEMENT - 3 CAR GARAGE |
| 006 | UNDEFINED TYPE - 6 CAR GARAGE | 114 | BASEMENT - 4 CAR GARAGE |
| 00X | UNDEFINED TYPE - 10 CAR GARAGE | 115 | BASEMENT - 5 CAR GARAGE |
| 010 | ATTACHED GARAGE/CARPORT | 116 | BASEMENT - 6 CAR GARAGE |
| 020 | ATTACHED BASEMENT GARAGE | 120 | BUILT-IN GARAGE |
| 030 | DETACHED BASEMENT GARAGE | 121 | BUILT IN - 1 CAR GARAGE |
| 040 | DETACHED GARAGE/CARPORT | 122 | BUILT IN - 2 CAR GARAGE |
| 050 | ENCLOSED BRICK GARAGE/CARPORT | 130 | BUILT UNDER GARAGE |
| 060 | BASEMENT FINISHED GARAGE | 450 | ATTACHED GARAGE |
| 061 | FINISHED BASEMENT - 1 CAR GARA | 451 | ATTACHED - 1 CAR GARAGE |
| 062 | FINISHED BASEMENT - 2 CAR | 452 | ATTACHED - 2 CAR GARAGE |
| 063 | FINISHED BASEMENT - 3 CAR GARA | 453 | ATTACHED - 3 CAR GARAGE |
| 064 | FINISHED BASEMENT - 4 CAR GARA | 454 | ATTACHED - 4 CAR GARAGE |
| 070 | FINISHED BUILT IN GARAGE | 460 | ATTACHED FINISHED GARAGE |
| 080 | UNFINISHED BASEMENT GARAGE | 950 | FRAME GARAGE |
| 081 | UNFINISHED BASEMENT - 1 CAR GA | 951 | FRAME GARAGE - 1 CAR |
| 082 | UNFINISHED BASEMENT - 2 CAR GA | 952 | FRAME GARAGE - 2 CAR |
| 083 | UNFINISHED BASEMENT - 3 CAR GA | 953 | FRAME GARAGE - 3 CAR |
| 084 | UNFINISHED BASEMENT - 4 CAR GA | 954 | FRAME GARAGE - 4 CAR |
| 090 | UNFINISHED BUILT IN GARAGE | 960 | FRAME/CONCRETE BLOCK GARAGE |

Fig. 39

| Foundation Type Code | Description |
| --- | --- |
| 001 | TYPE UNKNOWN |
| 999 | BYPASS |
| BLK | BLOCK |
| BRK | BRICK |
| CNB | CONCRETE BLOCK |
| CNF | CONTINUOUS FOOTING |
| CNW | CONTINUOUS WALL |
| CRB | CONCRETE BEAM |
| CRE | CONCRETE |
| CRS | CROSS BRIDGED/WALLS |
| DRE | DIRT/EARTH |
| GDB | GRADE-BEAM |
| MSN | MASONRY |
| MUD | MUD SILL |
| PIL | PILINGS |
| PIR | PIER |
| PPI | PIPE/IRON |
| PRE | PRE-FAB |
| RAB | RAISED W/BASEMENT |
| RAC | RAISED W/CRAWSPACE |
| RAS | RAISED |
| SDF | SPREAD FOOTING |
| SLB | SLAB |
| STD | STANDARD |
| STE | STEEL |
| STM | STEM WALL |
| STN | STONE |
| UBM | TYPE UNKNOWN WITH BASEMENT |
| UCR | TYPE UNKNOWN WITH CRAWSPACE |
| UPB | TYPE UNKNOWN WITH PART |
| WOO | WOOD |

Fig. 40

| | |
|---|---|
| 00M | Bi-Level |
| 00N | Multi-Level |
| 00P | Split 2 Level |
| 00Q | Split 3 Level |
| 00R | Split 4 Level |
| 00S | Split 5 Level |
| 00T | Split 6 Level |
| 00Q | Split Foyer |
| 00V | Split Level |
| 00W | Tri-Level |

Fig. 41

| Source of FFH-Creating Methods | Rule # |
|---|---|
| FFH Determined by Elevation Certificate (EC) --> land survey | 1 |
| FFH Exacted by AI and Property Imagery | 2 |
| FFH Extrapolated by Elevation Certificate and Neighbohood Property Similarity | 3 |
| FFH Extrapolated by AI & Propety Imagery and Neighbohood Property Similarity | 4 |
| FFH Estimated by FEMA Base Flood Elevation (BFE) | 5 |
| Default FFH at Individal Proproperty Level | 6 |
| Default FFH at ZIP Plus 4 Level | 7 |
| Default FFH at ZIP Code and National Level | 8 |

Fig. 54

USE OF A CONVOLUTIONAL NEURAL NETWORK TO AUTO-DETERMINE A FLOOR HEIGHT AND FLOOR HEIGHT ELEVATION OF A BUILDING

CROSS REFERENCE TO RELATED PATENT APPLICATIONS

The present application is a continuation of U.S. patent application Ser. No. 16/864,342, filed May 1, 2020, which claims the benefit of the earlier filing date of U.S. provisional patent application 62/842,023, filed May 2, 2019, the entire contents of which being incorporated herein by reference. The present application also contains subject matter related to that disclosed in U.S. Pat. No. 9,639,757, the entire contents of which being incorporated herein by reference.

BACKGROUND

Technical Field

The present disclosure relates to computer-based systems that perform image recognition on images of real properties, especially improvements on the real properties, such as residential buildings. The disclosure also relates to systems and methods that use the detected objects along with other information to identify a floor height and elevation of a building.

SUMMARY

According to an aspect of the present disclosure, a computer-based system automatically, accurately, and reliably detects floor heights and elevations of improvements (e.g., buildings, such as houses) on parcels of land without human inspection of the property. Fusing aspects of image processing, artificial intelligence (AI), property characteristics and spatial and elevation information (such as building footprint, lowest adjacent grade, and land slope) of a specific property, the present computer-based system identifies a first floor height (FFH) of the improvement with respect to the terrain (or surface) of the parcel of land on which the improvement is located. In turn, by knowing the FFH of the improvement on the parcel, it is possible to improve on conventional methods for estimating flood risk to a property without requiring a personal inspection of the structure by a human. Likewise, having this FFH information in a database for properties in a region enables the insurance industry and governments to more effectively expand the flood insurance coverage to homeowners who do not presently quality, as well as lower financial risks from flood hazards, and increase recovery speed against flood disasters.

For obtaining flood insurance, homeowners typically are required to conduct a certified analysis to identify a lowest floor elevation on their property. This is a manually intensive process that costs between $169 to $2,000 according to massivecert.com, and often is a factor that causes homeowners to not obtain flood insurance even though their property is at risk of flood damage. In a traditional survey method, a homeowner must hire engineers or surveyors to dig in their yard and to find the lowest spot, and then determine FFH before they can acquire flood insurance. The present disclosure describes a way of determining FFH without manually inspecting the property and leverages AI technology applied to images to obtain FFH from any direction and location along the structure's footprint, thus avoiding the effort and expense of obtaining the information manually. Moreover, because the present system and method can identify FFH based on image processing and feature detection, the present disclosure also addresses how to create a database of FFHs for properties across the United States, thus greatly simplifying and lowering the cost thresholds for individuals to apply for, and obtain flood insurance.

According to one embodiment, a method of detecting a first floor height (FFH) of a first floor of a building relative to a terrain of a parcel of land on which the building is located, the method includes:
  obtaining information on a building footprint of the building on the parcel of land;
  applying an image of the building to a convolution neural network-based (CNN-based) AI engine that has been trained to identify a first floor of a building from the image;
  analyzing the image with the CNN-based AI engine and determining the FFH of the building;
  extracting digital elevation map information of the terrain from a dataset for the parcel of land;
  converting the FFH of the building to a first floor elevation (FFE) from the FFH and the digital elevation map information; and
  identifying a part of the building footprint at a lowest adjacent grade (LAG) along the building footprint so as to detect an elevation of the parcel of land and the FFE of the building at the LAG along the building footprint.

In other embodiments, a system and non-tangible computer readable medium are disclosed for detecting a first floor height (FFH) of a first floor of a building relative to a terrain of a parcel of land on which the building is located.

BRIEF DESCRIPTION OF THE DRAWINGS

The patent or application contains at least one drawing executed in color. Copies of this patent or patent application publication with color drawing(s) will be provided by the Office upon request and payment of the necessary fee.

A more complete appreciation of the invention and many of the attendant advantages thereof will be readily obtained as the same becomes better understood by reference to the following detailed description when considered in connection with the accompanying drawings, wherein:

FIG. 3 is a table of Federal Emergency Management Agency (FEMA) flood insurance rates for properties in A* zones based on elevation variance between the lowest flood elevation and the base flood elevation (BFE), wherein A* zones are areas subject to inundation by a 1-percent-annual-chance flood event.

FIG. 4 is an example of a manually developed building elevation certification often required for obtaining flood insurance.

FIG. 5 is a National Oceanic and Atmospheric Administration (NOAA) chart that lists 1,000 yr. storm events.

FIGS. 32A-32C are training images of basement windows and a height from ground level to a basement floor.

FIG. 39 is a chart of unfinished space codes stored in a database for different types of houses.

FIG. 40 is a chart of foundation codes stored in a database for different types of houses.

FIG. 41 is a chart of story codes stored in a database for different types of houses.

FIG. 54 is a chart of sources of FFH information used by a method according to an embodiment.

DETAILED DESCRIPTION

The present disclosure may be embodied as a system, a method, and/or a computer program product. The computer program product may include a computer readable storage medium on which computer readable program instructions are recorded that may cause one or more processors to carry out aspects of the embodiment.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
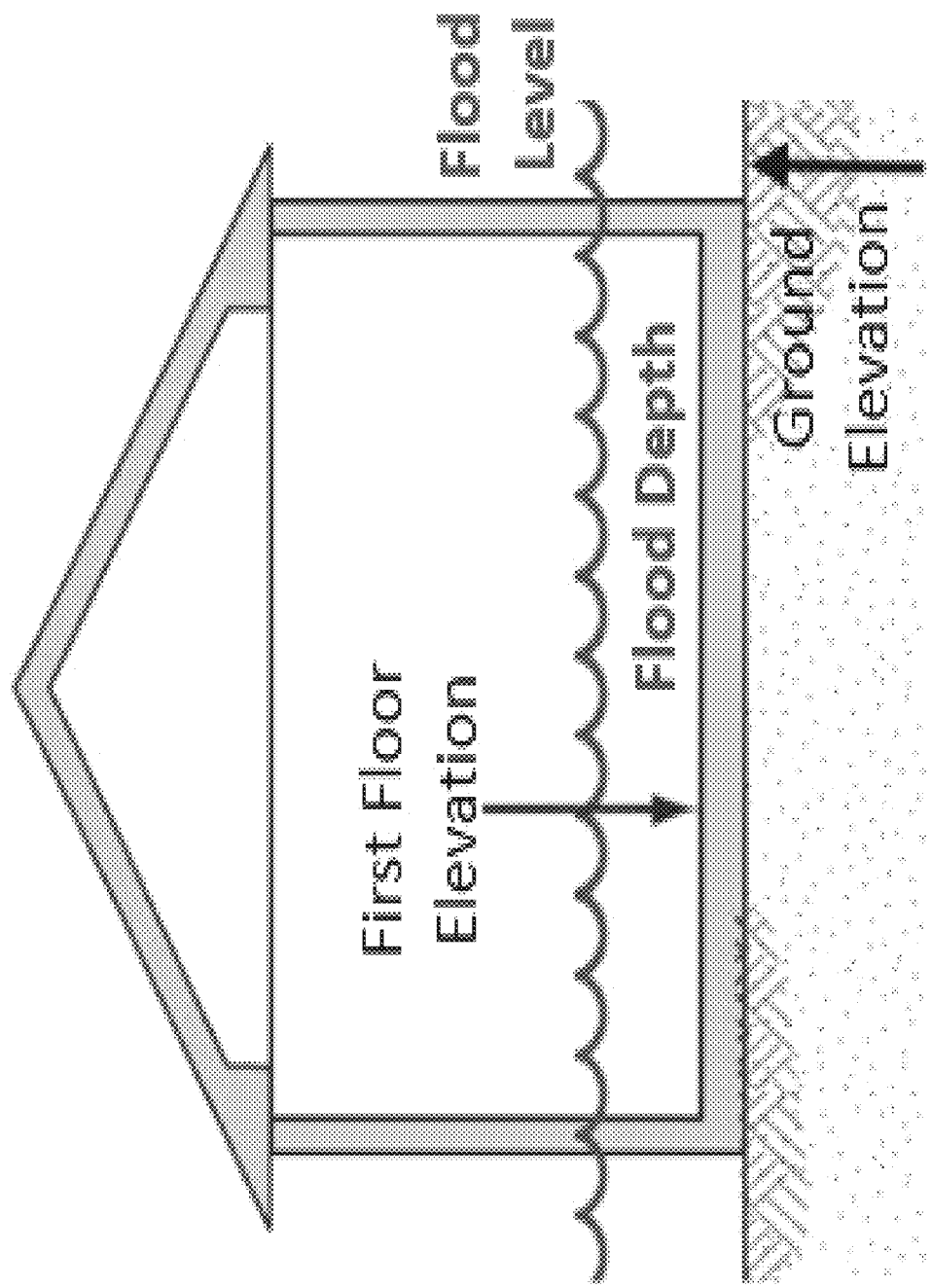
FIG. 1 is a diagram a house having a first floor elevation (FFE) that is below a level of flood.

Elevations are references made with respect to sea level (such as FFEs, lowest floor elevations, and associated measurements). First floor elevations are criteria for providing flood insurance pricing because they are related to flood-depth based loss assessment. The concept for FFE for a one-story structure and its relationship to the water depth from a flooding event is presented in FIG. 1. In FIG. 1, as can be seen, when a sub-floor does not exist (such as basement) in a property, FFEs occur adjacent to the ground elevation, and are the lowest floor elevations in properties. Thus, FFE contains two components: first floor height (i.e., height of the floor above the ground elevation) and the ground elevation. Accordingly, when a flood level surpasses FFE above the ground, the first floor of the house floods. A depth of the flood in the building is directly related to the height of the flood elevation level above the FFE.

Figure 2:
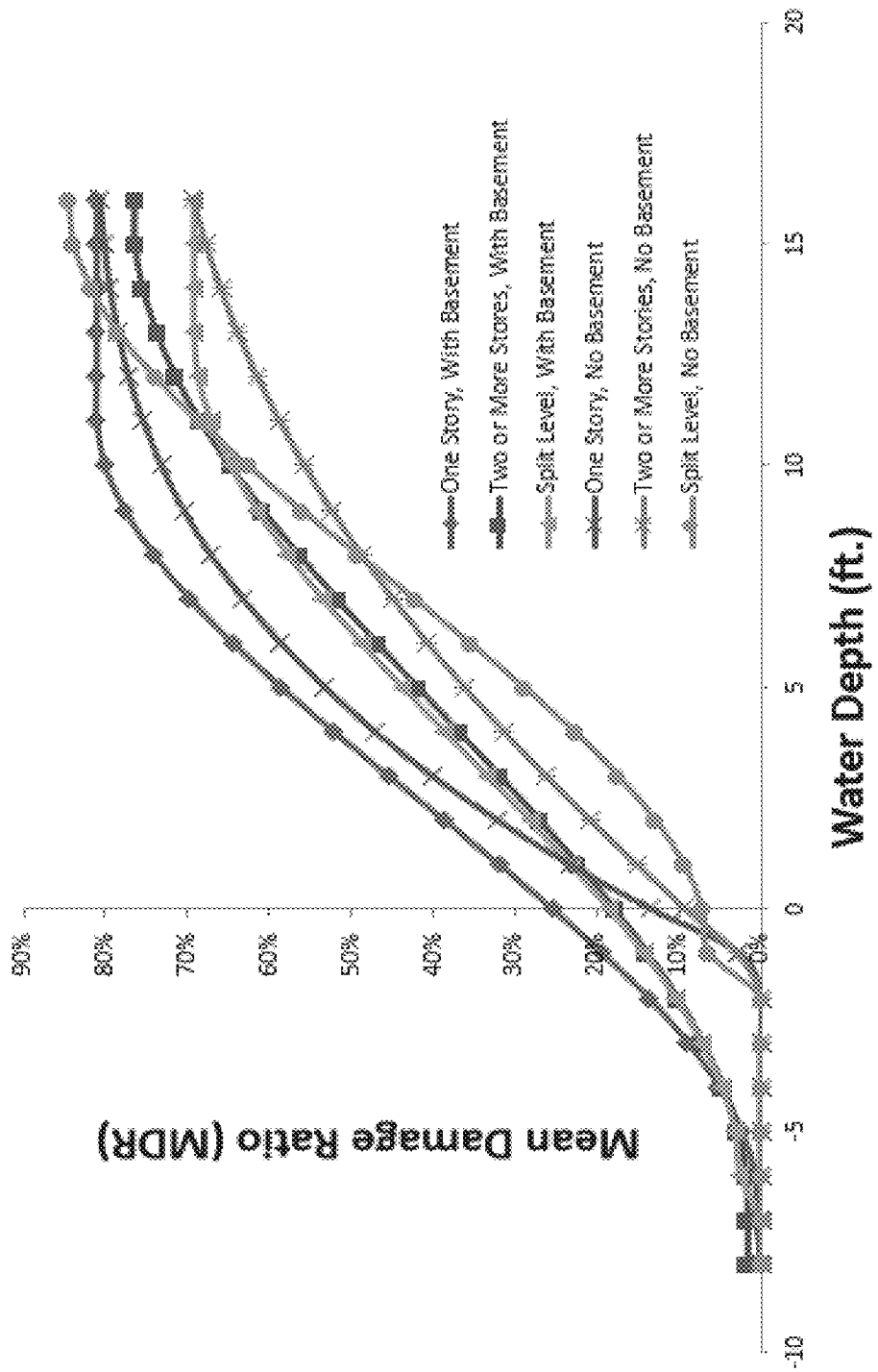
FIG. 2 is a graph of mean damage ratio vs. water depth for various real properties with differing structures and building types.

Flood loss, in an insurance context, can be estimated by using the flood depth from the FFE and vulnerability curves (mean damage ratio as a function of flood inundation depth). Example vulnerability curves are shown in FIG. 2, which plots mean damage ratio (MDR) to water depth in feet for various house structures, with and without basements. As can be seen, the MDR increases with water depth, where the first floor is located (e.g., whether a basement is included or not), and number of floors. For a given structure, and water depth above the FFE, the MDR can provide an estimate of flood damage to the building as a product of the MDR and water depth. Accordingly, for a $100,000 house, that experiences a water depth of 5 feet, with a corresponding MDR of 20%, would have an estimated flood damage of $20,000.

Flood analytic models and insurance companies often take the FFH between the FFE and ground elevation as a model input for flood loss computations or their rating methods. The sub-floor information (such as basement) is modeled with parameters (such as "One Story Building with Basement"), implemented by using different vulnerability curves. For some others (such as FEMA), the lowest floor elevations are required measurements for flood insurance policy underwriting. Normally, building entrances are constructed at the first floor as main access to the building. Conducting manual elevation surveys on the FFE of structures and determining the lowest elevations of properties by physically measuring vertical heights of other components of the properties is an expensive and labor-intensive task.

In the United States, federal flood insurance (NFIP) and its rates are regulated by the relationships between the Base Flood Elevation (BFE), a computed elevation to which floodwater is anticipated to rise during a 100 yr. flood event, and the lowest floor elevations of properties. FIG. 3 shows NFIP insurance rates at different depth variance between the lowest floor elevations and the BFE at the location for A* Zones. A* zones present the floodplain with 1% annual chance of flooding (100 yr. flood, and example of a base flood). As presented in FIG. 3, an insurance rate can be increased substantially with rise in water depth. As recognized by the present inventors, when water depth above the associated floor is not appropriately determined, either flood insurance rates are insufficient to ensure the financial health of a flood insurance program, or they represent overpayment by customers. In comparison with other hazards, flood is the only peril that requires such detailed physical measurements for natural hazard insurance, because a small elevation difference would lead flood water flowing to different directions and inundating a different area.

Figure 4:
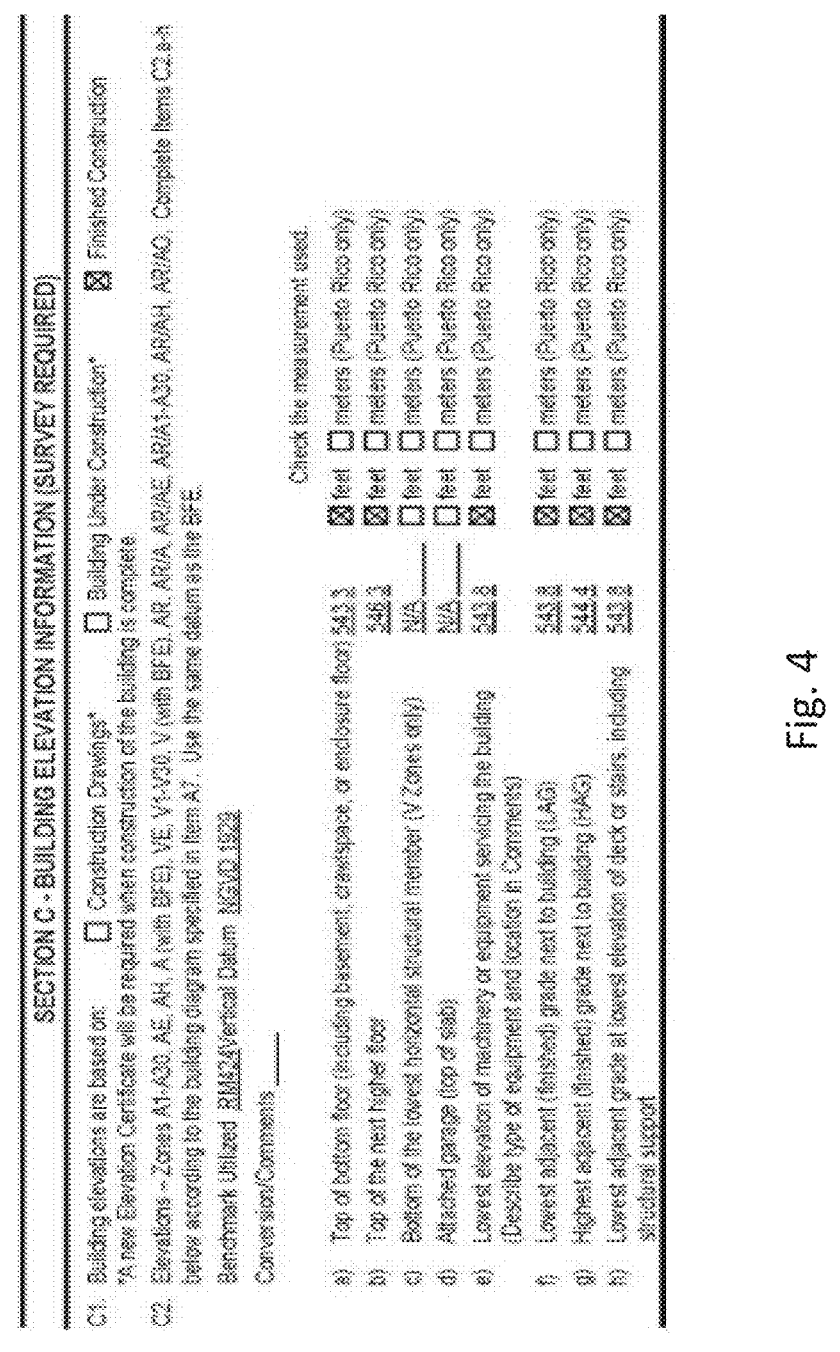

To acquire NFIP flood insurance, homeowners are required to have conducted on their property a determination of lowest floor elevation. This is performed manually, and a cost of a typical elevation certificate (EC) ranges from $167 to $2,000 according to massivecert.com. FIG. 4 shows an exemplary Building Elevation Certificate. There could be over 40 million properties in the US that are at some level of flood risk, so obtaining an EC for each would be exorbitant, over $12 billion in aggregate.

ECs were one of reasons that only about 50% properties in special flood hazard areas (SFHAs) have flood insurance. The cost of manually performing an evaluation of a property is also very high, and to make sure coverage rates are protected sufficiently by the insurance companies, the insurance rates are out of reach for many homeowners. This is best illustrated by recognizing that at the national level, roughly 30% of national properties are at some level of flood risk, but only 4% of properties have flood insurance policies. As recognized by the present inventors, developing an effective technology that can lower the cost barrier of flood insurance so more people can have their house covered, is of high interest.

In recent years, severe flood events hit the United States frequently and repetitively. FIG. 5 shows the NOAA list of 1,000 yr. storm events since 2010. Severe storms occur almost every year. Thus, a huge number of homes remain at risk and as climate conditions change, and sea levels rise, this risk is only becoming more amplified. As highlighted by rectangular boxes in FIG. 5, the 1,000 yr. flood events (such as Ellicott City Floods, highlighted in the table) were reoccurring at the same location as frequently as a two-year period.

Based on the NFIP statistics, about 90% of flood claims have water depths less than 3 feet. Therefore, water depth should be much more granular than 3 feet. In other words, to ensure accuracy of water depth computation in flood loss estimation, the technology for determining first floor height or elevations would ideally have the ability to control its vertical accuracy on elevation measurements under several inches and at the most, less than a single foot. Otherwise, flood loss analyses and flood insurance pricing may not be reliable.

Smartphones have become one of the important tools in today's life. However, both horizontal and vertical accuracy of the GPS units in smartphones would be in the range of multiple meters, insufficient for the purpose of floor elevation determination. Therefore, more sufficient technology needs to be developed for addressing the problems in the floor elevation determination.

Figure 6:
FIG. 6 is an image illustrating image processing performed by AI engine according to the present disclosure in which the AI engine creates bounding boxes around regions of interest (ROI) used to identify objects in an image.

In recent years, artificial intelligence (AI) has advanced profoundly on abilities to perform object detection on photo images and videos has made significant progress. AI technology can automatically detect, recognize, and extract objects from photo images and videos and convert them into the consumable information for many purposes. FIG. 6 is a training image with boundary boxes around objects that are detected by a trained AI image processing engine. U.S. Pat. No. 10,438,082, the entire contents of which being incorporated herein by reference, describes an AI engine that is trained to form boundary boxes around regions of interest (ROI) in objects and then have the type of object detected in that image. As will be discussed later in this disclosure, FIGS. 48-52 describe a detailed AI-based engine trained to detect features (e.g., front doors of houses) in images to ascertain where the FFH is located on an improvement (e.g., house) on a parcel of land. In FIG. 6, boundary boxes are formed around a streetlight (blue), buildings (red), entrance (purple), windows (dark blue), people (green), and cars (gray).

Because photo images can often contain complex information fusion, reliabilities of the object detections would be difficult to reach 100%.

As recognized by the present inventors, a reliability of detecting specific property-related objects, including property entrances, doors, doorsteps and other related objects, is an attribute of the present disclosure, so that the detected property objects can help to accurately determine floor elevations, which in turn is then directly useful for performing flood risk assessment and flood insurance rating purposes.

As discussed herein, there are three general categories of information that that are fused to form a comprehensive solution to floor elevation determination. First, Corelogic's comprehensive national property characteristic database is used, which contains 147 million properties, and covers over 99% of the US population. This database includes land and property characteristics with over 200 data elements and measurements on the respective properties. The database has been geospatially enabled by the property parcels and building footprints. Building footprints define floor area extents, where building walls could be constructed. Any structure objects (such as entrances, doors, doorsteps, and rooms) of buildings and contents inside buildings have their unique correlations to building footprints both geospatially and physically, and that is the scientific foundation of the property object detection in this technological development.

Figure 7:
FIG. 7 is an aerial image of a region with multiple property building footprints individually outlined in the image.

An example of building footprint data available in the database is shown in FIG. 7, with red-dashed outlines over building footprints, and adjacent streets. Although not shown in FIG. 7, the database also includes parcel overlay information (like that shown in FIG. 11) such that a property boundary for each parcel viewed in an arial image are visible. Moreover, for the 147 million properties, the database includes property characteristics, property photos, building layouts, flood insurance information, multiple listing information and history, geocoded tax, hazard data, assessor maps, estimated cost, and parcel and structure footprint polygons, as well as other, as described at https://www.corelogic.com/about-us/data.aspx.

Another source of information is the increasing availability of high resolution and bare-earth elevation datasets with submeter vertical accuracy, generated by LiDAR (Light Detection and Ranging) technologies. United States Geological Survey (USGS) produces a 1 m digital elevation dataset (DEM), which is being expanded for nationwide coverage (https://pubs.usgs.gov/tm/11/b07/tmll-b7.pdf). According to the present disclosure, by obtaining relative heights of exterior and interior property objects above the bare-earth elevation, floor elevations are then calculated. The present inventors realized that building entrances are designed as the main access for the structures, and commonly connecting to the main floor, called the first floor. If the height of bottom of the entrance doors or the heights of the top of doorstep above the ground are measured, FFEs can be determined by adding those heights to their ground elevation. If a structure sits on a land slope, first floor height would be different at different locations around the structure because land elevation varies. High resolution elevation dataset and structure building footprint geometries can be used to facilitating the "FFH to FFE" conversion at the location where FFH is measured. The approach can provide a flexibility to allow advanced imagery processing technology to measure FFH from any direction around the structure.

Figure 8C:
FIGS. 8A, 8B, and 8C are images showing interior and exterior perspectives of different properties.
Figure 8B:
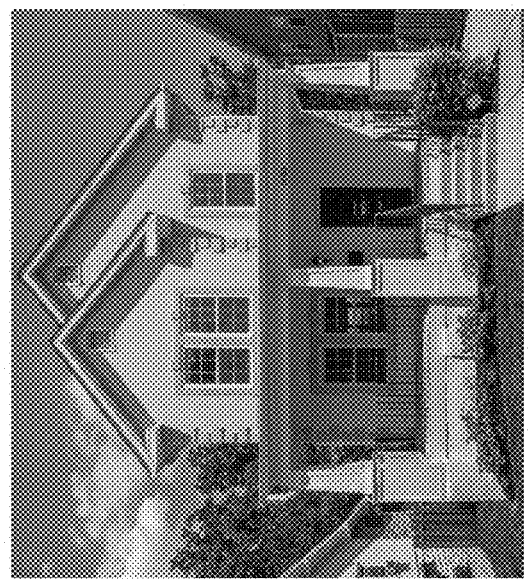
Figure 8A:
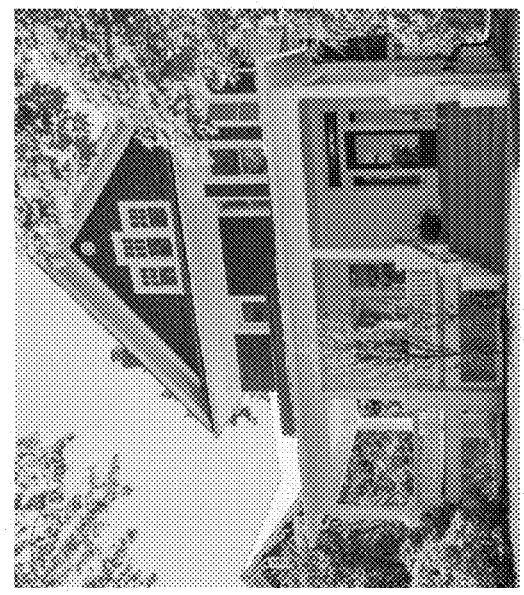

In addition, many billions of high resolution photos and videos from both inside and outside properties have been taken with smartphones. The photos created from smartphones in close distance ranges can be very detailed and information rich. The entrances of properties are one of the most important components of structures. In addition to the photo collected in Corelogic's database, other images are available of properties, such as postings on multiple listing service (MLS), which includes photos and building information associated with a parcel's address, those available through photogrammetry techniques, and others with dimensions of entrances, doorsteps, and rooms. Examples of images and renderings or particular properties collected in the database are showing in FIG. 8A, FIG. 8B, and FIG. 8C. FIG. 8A shows a house with a concave entrance door structure, a three step elevation, and offset with respect to a street view. FIG. 8B shows an aligned street view of the front entrance of the house with a five step entrance leading to the front door. FIG. 8C is an image of an interior of a house, and includes a basement level. These images are used for training the AI engine to determine FFH based on ROIs detected in the images that related to FFH, such as main entrance door, features around the main entrance door, such as front step, hand railings, entrance lights, door handles, etc., as will be discussed.

By automatically, accurately, and reliably detecting floor elevations of properties, the insurance industry and governments can effectively expand the flood insurance market, lower financial risks from flood hazards, and increase recovery speed against flood disasters.

Methodology for Auto-Determining Floor Elevations of Properties

Figure 9:
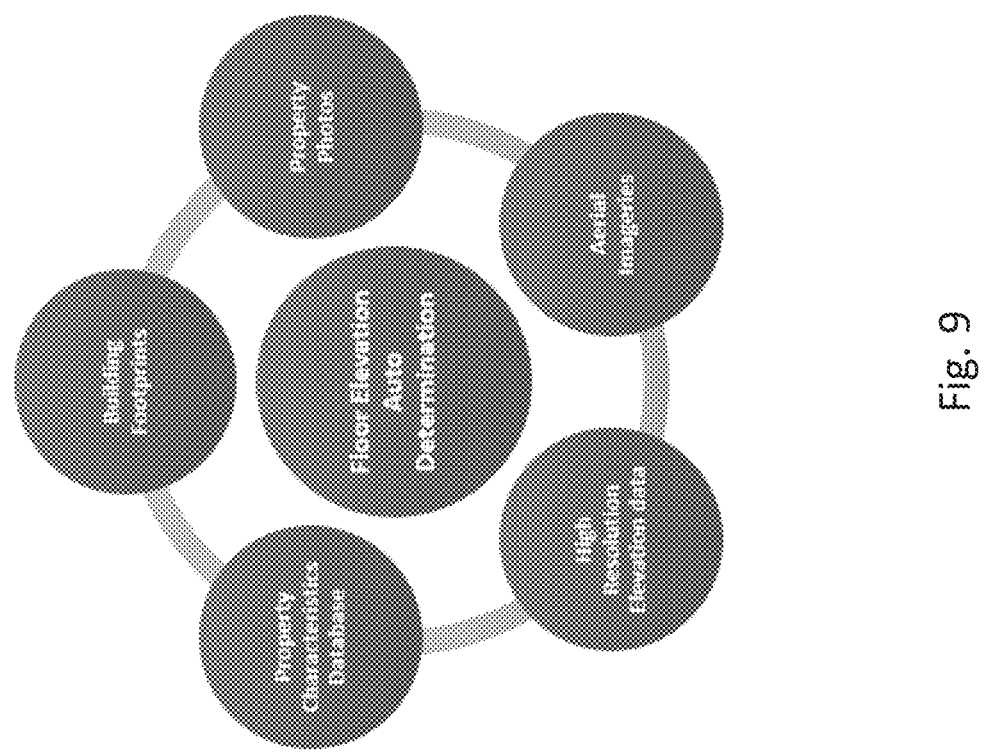
FIG. 9 is a diagram showing an arrangement of components of a system and method for automatically determining a floor elevation of a real property according to the present disclosure.

As illustrated in FIG. 9, the present disclosure integrates the following comprehensive information to reliably and accurately determine floor elevations for flood insurance rating and flood risk assessment.

Figure 10:
FIG. 10 is an aerial image of an area with example building footprints with street segments identified.

A building footprint dataset, contains detailed geometries of structures (like those shown in FIG. 10) that can be used to geospatially correlate detected structure objects to the location where the objects were detected and measured. In turn, this helps facilitate land slope assessment along structure boundaries, to determine key land points around the structure (such as lowest adjacent grade, highest adjacent grade) that can be used in floor elevation determination, and to provide the data linkage to comprehensive information on property characteristics. The polygon geometry of a building footprint contains all possible location points (such as the lowest adjacent grade point, entrance location point, and so on) around the perimeter of the building. Because buildings are where people live or work, daily activities crossing building footprint boundaries are essential human behaviors. Therefore, studying the relationship between human behavior and building structures can guide how to detect the main floor of the building.

A repository of aerial photos from today's technologies (such as satellites, aircrafts, drones, and others) saved in the database or uploaded contemporaneously, help to identify walkways and other manmade landscape features in their properties, and to discover property entrance points/doorstep locations. In addition, remote sensing technology can effectively detect manmade activities (property lighting) on the earth's surface, that can help us to automatically determine the locations of the property entrances by identifying walkways that connect to the buildings.

Property photos are used for detecting entrance doors and doorsteps through AI technology and measure dimensions of detected exterior property features and surrounding (such as entrance doors, doorsteps, windows, crawlspaces, basements, piers, garages, ground and others) and interior property features (such room dimensions).

Comprehensive property information on structure characteristics (such as foundation types, property styles, year built, basement information, structure design drawing, and so on) from property databases, is used to help determine or estimate first floor heights based on the engineering design specifications (such as building codes) and other common characteristics. In some cases, data elements for characteristics may not be fully populated. Statistical models like those discussed herein are used to extrapolate missing data (such as foundation types) based on properties in neighborhoods with the information and other property characteristics.

High resolution land elevation datasets generated by LiDAR technology provide accurate ground elevations, so that the derived first floor heights can be converted into floor elevations on a common vertical datum. In conjunction with building footprint dataset, the conversion on derived FFHs at any grid points surrounding the structure can be conducted. Furthermore, using FFEs as a referencing elevation, the lowest floor elevations can be derived by using the dimensions of sub-floor structures, that can be very information for flood loss assessment and insurance rate determination Property photos including dynamic spatial information enabled by mobile devices (such as smartphones) are used for further validating the detection of those objects on properties. The dynamic information collected by smart phones, including side-mounted vehicle cameras, for example, can effectively capture interactions between people and structures where they are living. Many human activities can happen on the first floor, that would lead discovering where the first floor is and what is its elevation.

The following sections describe how to reliably and accurately determine entrance locations, detect structure objects (such as doors, doorsteps, crawlspaces, basements, piers and others), correlate them to building footprints, and calculate vertical heights of those objects above the ground by using artificial intelligence, such as trained convolution neural network (CNN). The AI processes described in this document (especially FIGS. 48-52 and related discussion) are used jointly for ensuring the accuracy of the floor elevation determination.

Determine Property Entrance Locations from Building Footprint Geometries

Building footprint geometries are used to determine all sides of the buildings that contain entrances to the properties by comparing the footprint geometries with street segment geometries. Normally, the entrances of buildings are constructed to face the street network because property access roads (such as driveways and walkways) need to be connected with the road network for convenience and low cost (the shortest distance). As previously cited, U.S. Pat. No. 9,639,757 describes how to obtain building footprints from images. Other building footprint images are either derived from the process described in U.S. Pat. No. 9,639,757, or are already stored in the property database.

Figure 13B:
FIGS. 13A and 13B are training images showing example real properties with convex geometries at respective entrances to the buildings on the real properties.
Figure 13A:
Figure 14:
FIG. 14 is a training image showing example real properties with concave geometries at respective entrances to the buildings on the real properties.

Building footprint geometries (like those shown in FIG. 10) may reflect some common types of building structures, particularly residential properties. The shapes of some specific property designs can be reflected in their footprint geometries, which are geometric shapes saved in a digital file that can be overlaid on the perimeter of a roof line. Based on convex and concave style geometries and the size of those convex and concave shapes specified in the associated building footprints, the entrance locations of properties can be determined as will be discussed in the next several figures. Furthermore, the front entrances will be determined with reference to other points on the building footprint and/or land elevations on the parcel. FIGS. 13A and 13B show buildings with convex geometries, and FIG. 14 shows buildings with concave geometries. In FIG. 14, the walkways on the aerial photos connect to the locations where building footprint geometry has a concave geometry. Both convex and concave structures, in combination with the terminus of a walkway is a strong indication of a front entrance for the property. These are features that are used when training the AI engine, as will be discussed, to more accurately detect the FFH of a house.

Figure 11:
FIG. 11 is an aerial image with an outline around a parcel, as well as entrance points, highest adjacent grade (HAG), lowest adjacent grade (LAG), and other points regarding FFH measurements identified.

With regard to multiple points around the building footprint, FIG. 11 is an image of a building footprint geometry used to determine locations of where FFH is measured, defined, or referenced. As can be seen from FIG. 11, a parcel boundary (red line) is a ROI and overlaid on an arial image. The building footprint is outlined, and a red dot is provided at a location of the footprint where the lowest adjacent grade (LAG) is located at the perimeter of the building footprint. The lat/longitude position of the LAG may be known from the DEM information discussed earlier. The yellow dot on the corner of the footprint is the highest adjacent grade (HAG), and the entrance point is signified by the green point. Green points are shown in adjacent properties as well, except for the building to the left of the main building, where the location of the entrance cannot accurately be located and so it is marked with a blue dot in a middle of a street facing segment. Orange points on the footprint signify any point where FFH is actually measured.

Figure 12A:
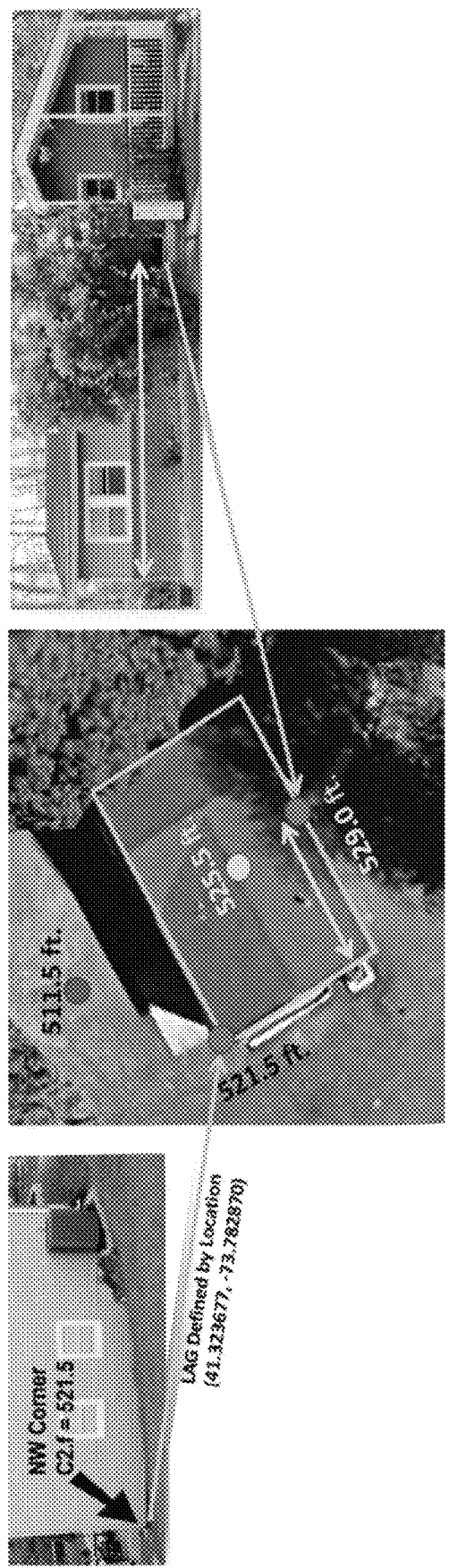
FIG. 12A is a diagram of related images showing how FFH is shown along with a parcel centroid, building centroid, LAG, and front-view notations.

FIG. 12A is used to discuss in more detail a particular property with a sloped terrain. FIG. 12A is a set of connected images showing, from left to right, a left side of a house, an ariel image of the house with a building footprint overlay, and a front image of the house. In this example, the grounds slopes from front to back. The first floor, which is part of the living space, is assumed to be flat, and thus the first floor nearest the street is close to the ground level, while the first floor overtop of the LAG could be many feet higher than ground level, depending on the severity of the ground slope. The first floor height, therefore, is a particular position (lat/long) and height above ground at the particular position. For flat properties, the FFH is consistent across the building footprint. For sloped terrains, the FFH will vary inversely with the slope, such that the FFH will be greatest at the part of the building footprint where the ground elevation is lowest, the LAG.

In the example of FIG. 12A, the HAG, which is known from the DEM and the footprint boundary, along with its coordinates (lat/long) is where the front entrance is located and is at 529.0 ft. in this example. The parcel centroid is at an elevation of 511.5 ft., and the LAG is located at an elevation of 521.5 ft. Coincidently, in this example, the main entrance is offset from the left side of the house by a predetermined distance, such as 18 ft.

Based on where the FFH's are determined/measured relative to the ground, the FFE will vary. For example, suppose the FFH is determined at the LAG. In this example, the LAG of 521.5 ft. is at a location lat/long at 41.323677, −73.782870 (determined from the DEM data), and the FFH is 9.3 ft above the LAG. In this situation the FFE=FFH+DEM (Lat, Long)=9.3+521.5=530.8 ft. This may be presented in a data structure as a FFH result derived from the LAG in the form of (41.323677, −73.782870, 9.3 ft). On the other hand, if the FFH is determined from the property imagery (front image on the right side of FIG. 12A), and the FFH is determined to be 1.8 ft., and the position of the front entrance is at (41.323596, −73.782758), then the FFE=FFH+ DEM (Lat, Long)=1.8 ft.+529 ft.=530.8 ft. The FFH result extracted from a front property image may then be presented as (41.323596, −73.782758, 1.8 ft.).

In this example, there are several different use cases for FFH, based on measurement points at the property. For example, in one case related to the parcel centroid (511.5 ft.), the FFH=530.8 ft.−511.5 ft.=19.3 ft. In a second case, relative to the building centroid, the FFH=530.8 ft.−525.5 ft.=5.3 ft. In a third case where the land is flat the FFH is the same across the property because there is not grade, and so the FFH is constant across the building footprint. However, in a fourth case, such as FIG. 12A, the ground may slope from the front of the house to the back of the house having a walk out basement, and thus the FFH will vary with terrain elevation across the first floor.

In a situation where the first floor is not the lowest floor (i.e., the house has a basement), the FFH should be adjusted for floor assessment purposes because the basement may be flooded. For example, if the flood elevation for a 100 year flood is 527.2 ft. (i.e., the BFE=527.2 ft.) and the first floor at the lowest point of the grade adjacent to the building is 3.6 ft. above the BFE, a flood premium should be charged because, despite the fact that the FFH is above the BFE, the property's walk-out basement is not. Moreover, a 100 year flood would have water entering the basement because the first floor is only 3.6 ft. above the BFE, which means the walk-out basement (likely 9 feet below the first floor) is below the BFE.

In the area where land slope is relatively flat, the structures could be constructed uniformly based on standard building codes, including the floor. Combining digital elevation model (DEM) information and building footprints, parcel boundary, or geocoding locations, relatively flat land areas can be identified based on land slope assessment on structure or near structure. With the foundation type (such as slab) information from a property database, standard first floor heights (such as 10 inch) for structures on the relatively flat land areas can be assigned.

In the areas where structures sit on land slopes, the first floors could be elevated. The size of the elevated first floor height could be correlated to land slopes. Therefore, land slope surrounding structures can be used as a parameter for determining first floor heights. Specifically, the elevation difference between the LAG and the HAG along with building footprint geometries can be applied to build such correlations. With the structure footprint dataset, elevations at different points of a building footprint polygon from land elevation datasets (such as DEM) can be extracted, so that LAG, HAG, land slope, and other land characteristics on are directly calculated as discussed above with respect to FIG. 12A. Furthermore, parcel boundaries are used as failover geometries for land slope characteristic assessment, in the event that a building footprint cannot be obtained with an adequate degree of confidence. Particularly, in many crowded urban areas, parcel boundaries can be very close to structures. Land slope assessment in an area around the parcel centroid could reflect general characteristics (such as flat or steep) of the structures.

Figure 12B:
FIG. 12B is a training image for FFH relative to slope.

FIG. 12B is an AI engine training image used to train the AI engine for detecting how FFH varies with slope.

Figure 12C:
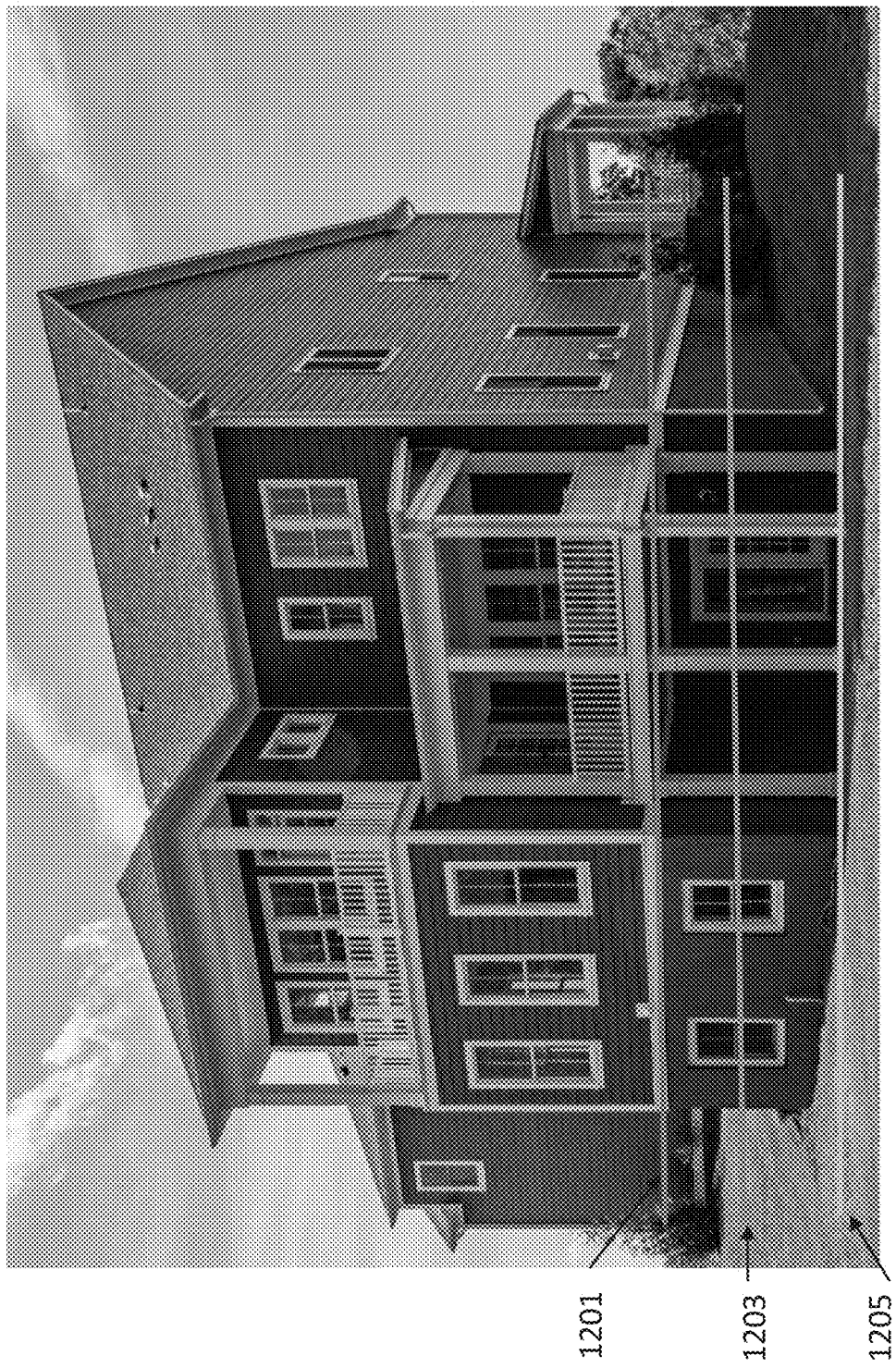
FIG. 12C is a training image for comparing FFE, BFE, and LAG.

Similarly, FIG. 12C is an AI training image used to train the AI image for distinguishing FFE 1201, from Freeboard/ Regulation/Building Code BFE/Flood zone 1203 level, and LAG 1205.

As mentioned above, FIGS. 13A and 13B show buildings with convex geometries, and FIG. 14 shows buildings with concave geometries, which are used for train the AI engine to detect main entrances on different images of houses.

Figure 15:
FIG. 15 is an example training image of buildings on land parcels where geometries of entrance doors are not coplanar with a front of the building.

FIG. 15 shows properties with section direction changes, and the main entrances identified with boundary boxes detected with image processing circuitry. These images may be taken with a street-view image capturing device, or service such as GOOGLE's street view, and then applied to the AI engine for detecting the main entrances of the buildings. Again, these features are used as training images to train the AI engine to detect these features to improve the probability of accurately determining the FFH of a house. Commonly, entrance doors may be constructed near where sections of the structure have significant direction changes (such as from parallel to perpendicular to the road network). Most likely, entrances are located in the common area on this style of structures, where all types of living spaces (such as kitchen and living room) connect to it. In most cases, the entrance on the common areas would provide convenient access.

Figure 16:
FIG. 16 is a training image of buildings with entrances that are near to geometry changes in a middle portion of the respective building footprints.

As result, the geometries of building footprints at such locations may have 90 degree turns in the middle section of buildings, as demonstrated on the building footprint of FIG. 16. The geometrical changes are used to determine the whereabouts of property entrances. Entrance locations of properties are identified when geometries of the detected walkway objects from aerial photos are connected, intersected, point to, or adjacent to the associated building footprint geometries. The list below presents the certainties on the entrance locations when a detected walkway object intersects its building footprint, and these parameters are used for learning a CNN to detect the front entrance. Walkway objects may be identified in specific characteristics: (1) curved and may connect middle section of the building footprint; (2) widths of walkways may be much narrower than driveways and nearby roadways, and (3) walkways may have different colors from the nearby driveways and roadways.

Figure 17:
FIG. 17 is a training image of a buildings with front walkways of varying geometries.

FIG. 17 are example training images of such walkways that lead to a main entrance, as indicated by the bounding boxes around ROI.

The main entrance of a house may also be detected from the movement pattern of a mobile phone. The movement pattern is another example of data that is input to the AI engine to detect the location of the front entrance of the house. The human movements can be effectively tracked by smartphones as a common functionality of the mobile device. When a mobile device (such as a smartphone) reports tracking information with the following pattern, the location suggests entrances of the properties: (1) the movement has a pause; and (2) the position device during the pause either on a building footprint boundary or near building footprint boundary. The door can be opened from either inside or outside; and (3) the pause frequently happens at the same spots (at the front of the door). In this situation, the homeowner can use an app that tracks his or her activities, and the app reports to the AI engine movement patterns for areas near and in the home. Rationale for property entrance detection based on human behavior/activities includes: (1) the entrance is the location of common access to the building; (2) opening or closing the entrance door take time; (3) unlocking and locking the entrance door take time; and (4)

the higher the frequencies of pause detection, the higher the certainty of the entrance detection The locations of the movement pauses can be automatically collected and used for detecting building entrance locations. When people enter or exit a building, they must cross the building footprint boundary line. Therefore, human behavior can be used for automatically detecting entrance locations. When a mobile device (such as a smartphone) reports walking waypoints/walking tracks and those recorded geometries of the movements intersect with building footprint boundary geometries, the locations could be the entrance locations of targeted properties. The higher the frequency of the crossing, the higher the certainty of the entrance detection.

Figure 18:
FIG. 18 is an overhead training image of a building with a walkway that approaches the building.

FIG. 18 is a training image with an overlay of data tracking of a smartphone, showing provides where walking tracks converge at a common threshold of the house, and then diverge once inside.

Building entrances are also determined by strength changes of cellular reception signals from mobile phones or device between the inside and outside of the building footprint boundaries. Geospatial locations of small strength changes could be automatically used to determine building entrance locations. This too is used as additional input for learning the AI engine.

Figure 19:
FIGS. 19A and 19B are training images of packages adjacent to a main entrance of a building.
Figure 19:
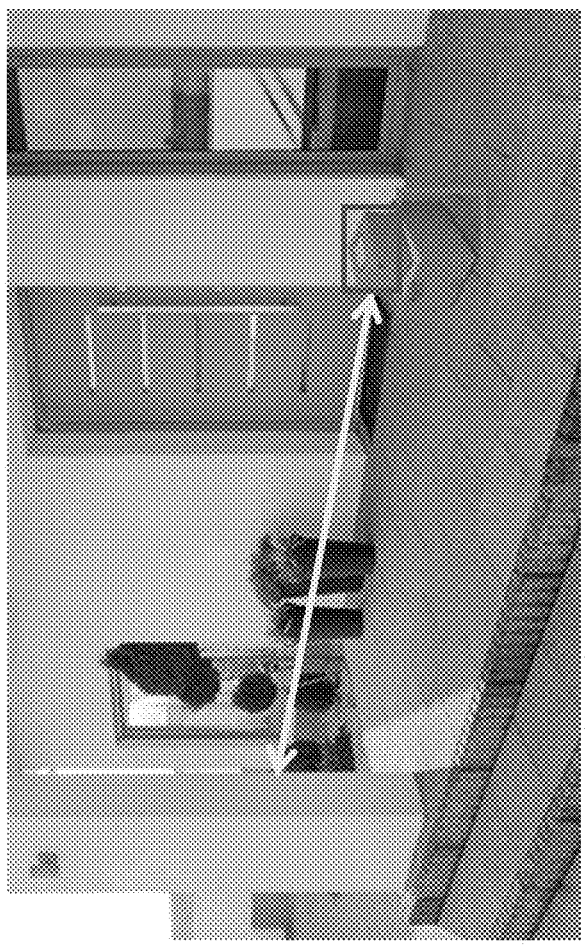

Another method of detecting a main entrance is detecting packages next to a house. With the online retail rapid growth, the "goods on our doorsteps" has become a common phenomenon. Property entrance locations may be identified where objects of delivered post packages are detected near or on building footprint boundaries, if the relative position of delivered packages to the building corners can be measured and the package can be automatically georeferenced. FIG. 19A shows and example of this situation where packages are placed a predetermined distance (see arrow) from a boundary from the building footprint. The location of the packages is suggestive of the location of the main entrance.

It is doubtless that if delivered post packages can be located on building footprints or near building footprints with small distances, there would be high success rates for identifying building entrance locations when the whereabouts of delivered packages are detected as presented on the photos below. Furthermore, many on-line companies (such as Amazon) had started to take photos on the packages at the delivering point and to prove the status of the "delivered" for their customers. The confirming photos (FIG. 19B) may provide very detailed imagery on the bottom of entrance door, doorsteps, and locations if photos contain location attributes. Package detection from photo images is another parameter that is used to learn the AI engine.

Figure 20:
FIG. 20 is a training image of cars detected in front of a hotel entrance.

For commercial properties, vehicle frequent stopping patterns may also be used to help on the detection of building entrance locations. Coming and going of hotel guests, for example, could be used to analyze special traffic patterns for the detection of hotel entrance locations. FIG. 20 is an example of this situation where cars are detected in front of a hotel entrance. Vehicle parking patters is another parameter that can be used to train the AI engine for detecting front entrances, especially on commercial properties.

Figure 21:
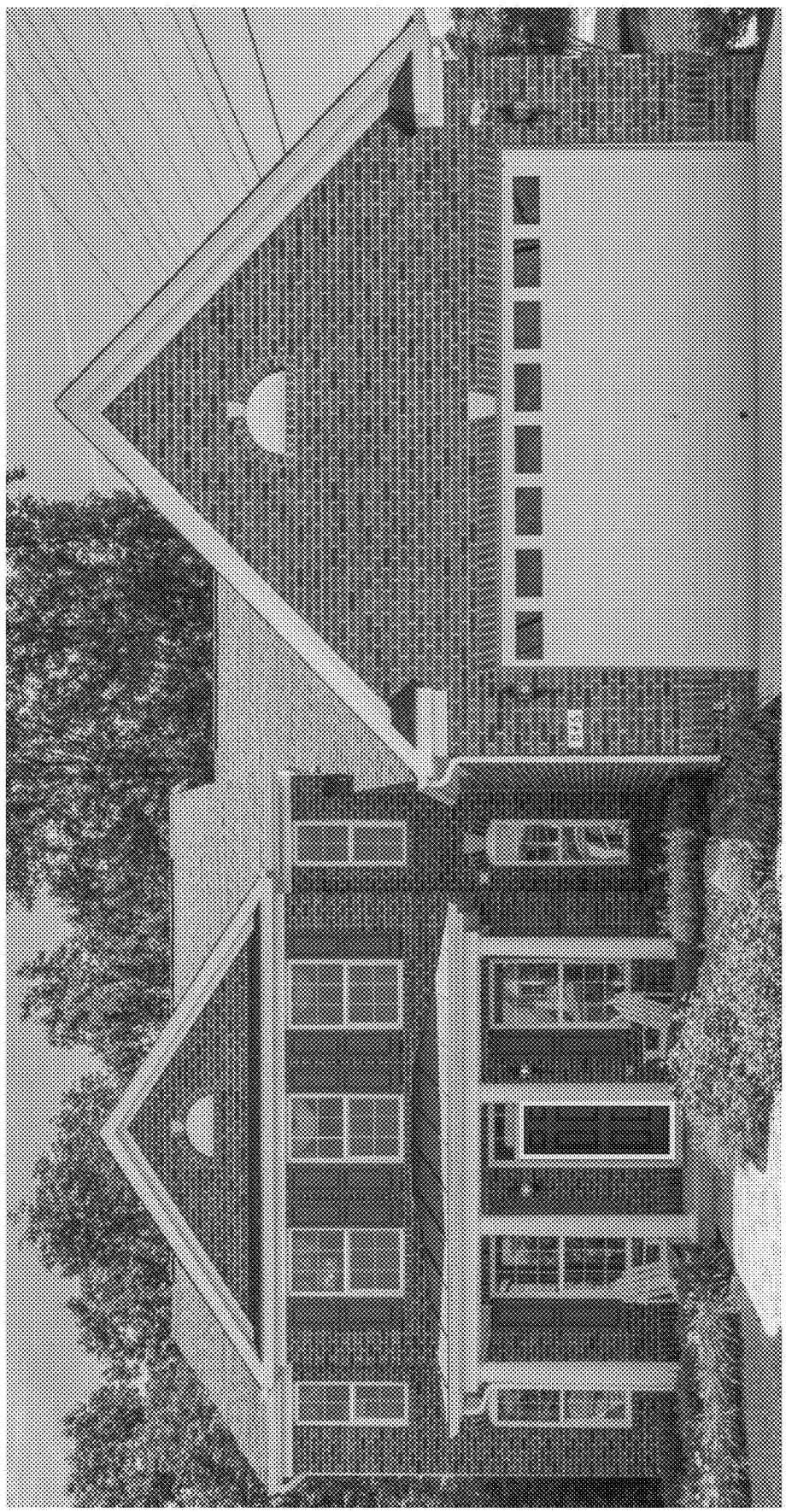
FIG. 21 is a training image of entrance door locations that are detected by image motion.

FIG. 21 is an image of a garage door and a front entrance detected in an image. A residential structure has two frequently moving parts as common characteristics: house entrance door and garage door. The function of any doors is "opening and closing", leading visualization changes on buildings. When buildings are monitored by a surveillance camera or smartphone camera, for example, videos can record such changes and detect areas of imagery changes on the structure when those doors are opening and closing. Since garage doors have much bigger sizes, smaller doors would be the building entrances. If camera locations are georeferenced, the entrance locations can be determined by video data or static photo images before and after door opening or closing. Images of detected door movement is another parameter used to train the AI engine.

Determine Entrance Locations from Georeferenced Property Design Drawings/Blueprints/Layouts Property design drawings/blueprints/layouts are important information, that could be captured and maintained by local governments and homeowners for many purposes, including property inspections. If the design drawings are georeferenced, entrance locations can be easily identified from the drawing and related information. Georeferencing on property design drawings can be achieved by matching up the corners of the design drawing with the corners of building footprints. Images of property design drawings are another training parameter that can be used for training the AI engine.

Figure 22:
FIG. 22 is a plan view of a training image of a building layout that shows property entrance locations.

In the property drawing of FIG. 22, for example, there are two door symbol polygons that intersect with the building footprint boundary. If the database attributes contain the information on main entrance door, the entrance can be directly defined; if not, the door facing the street network can be selected as the main entrance door of the property.

The processes described herein are jointly applied for determining entrance locations of properties and ensuring reliability of the entrance location determination. If the building layout drawing contains doorstep dimensions and dimensions of sub-floor rooms, the information can be also used directly for floor elevation determination.

Use Building Footprints to auto-Determine Highest and Lowest Ground Elevations

Figure 23:
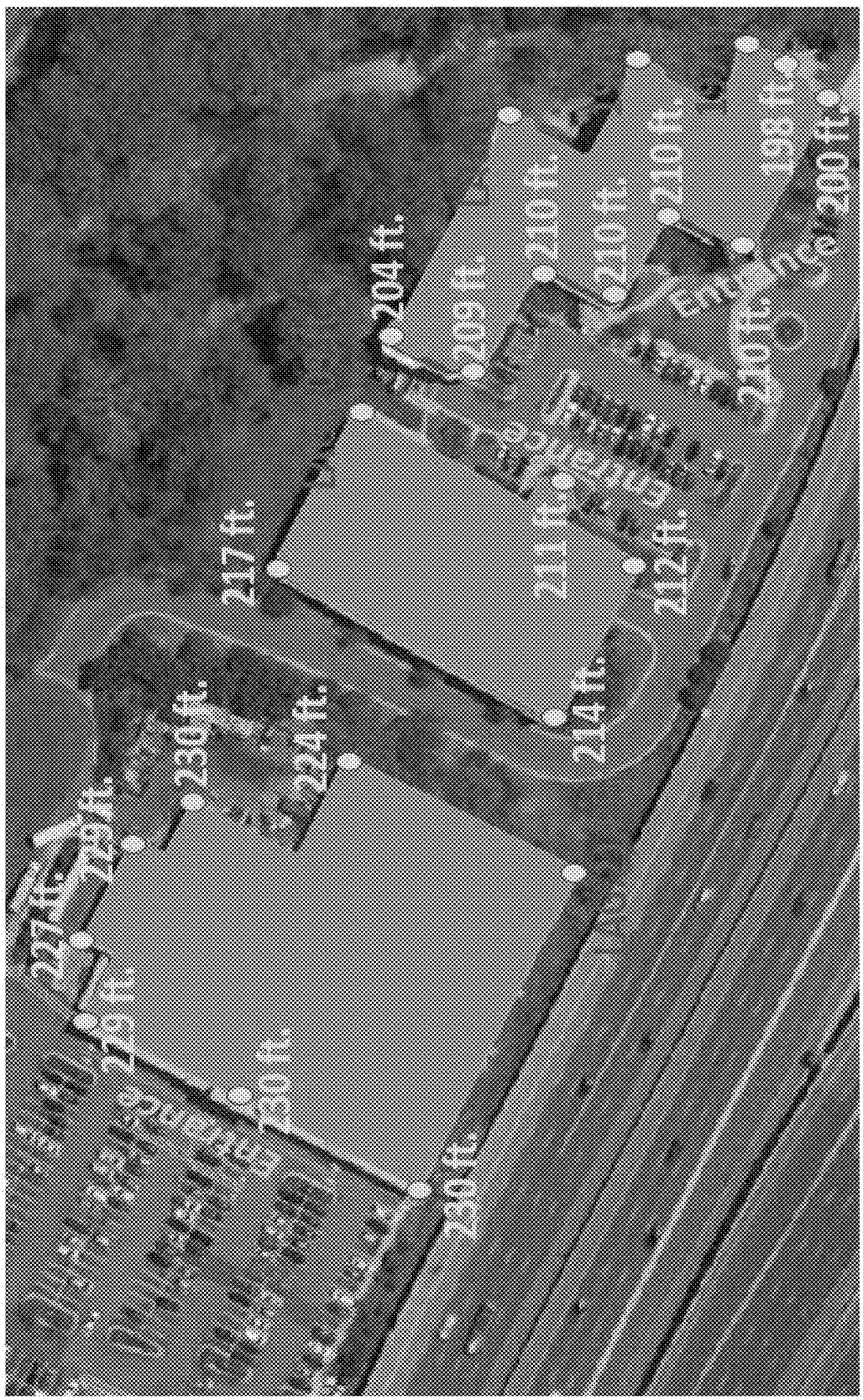
FIG. 23 is an aerial image of that shows LAG elevation for example building as determined by an auto-determination process according to the present disclosure.

The discussion above discussed some methods for detecting property entrance locations. With the building entrance location at the building footprint, ground elevation (most adjacent grade) for the entrance can be automatically determined by using the elevation dataset. Elevation of the lowest ground surface that touches any of the exterior walls of a building is LAG, which is an important parameter in flood insurance rating computation and risk assessment. LAG may indicate the highest risk point for the structure. With the building footprint geometries, the land elevations at all boundary points can be extracted and both the LAG and the HAG can be automatically determined by comparing land elevations at all boundary points. The difference between HAG and LAG can be also used to gauge the land slope around the structure. If the difference is very small, it could indicate that the land at the structure would be relatively flat; if the difference is very large, it could represent steep land slope around the structure. FIG. 23 is an image with an overlay of LAG indicates for building structures.

Figure 24:
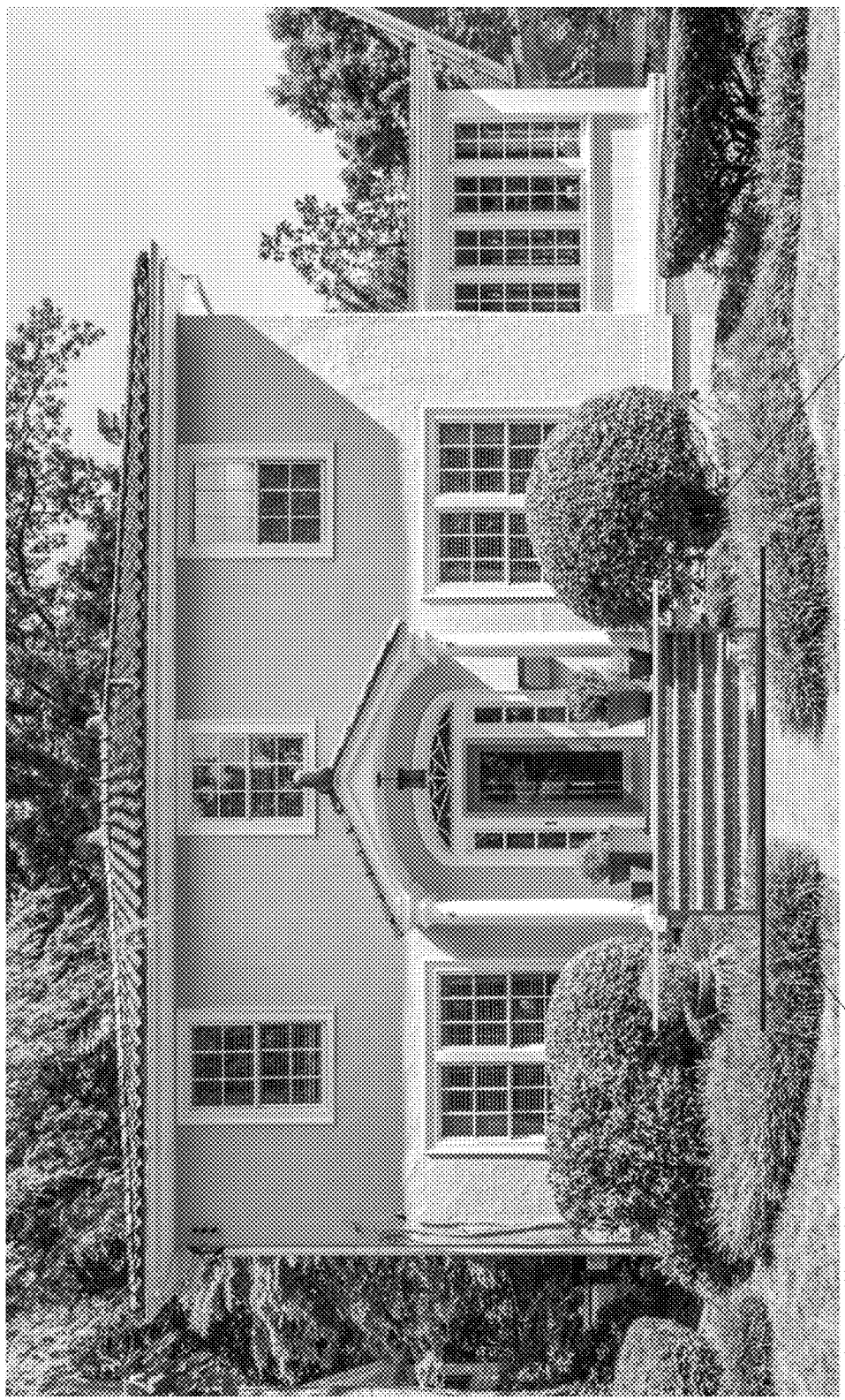
FIG. 24 is a training image of a building showing a relationship between a detected ground elevation, FFE and entrance stairs.

Detect Entrance Doors and Doorsteps by using Property Photos and AI Object Detection In the above sections, it was discussed how the locations of property entrances can be automatically detected. In property entrance locations, three important objects are used to determine FFHs. Entrance door and doorstep are key parts of building structures, that facilitate our access to the structures: main floor or first floor. As the FFH definition, one end of the vertical measurement is at the structure and another end at the ground. Therefore, the ground line may need to be detected and delineated for the height measurement. FIG. 24 shows an image with boundary boxes around steps leading to a main entrance with overlays for ground elevation 2403 and first floor elevation 2401. In FIG. 24 the steps are used to help detect the entrance door or doorstep objects for flood elevation determination, and to measure the height of either the entrance door bottom or the top of the doorstep and add the height to the ground elevation from DEM to calculate FFEs. The data elements for both first floor heights and FFEs are useful for a variety of flood and insurance applications and they would be collected and stored. Thus, detection of doorsteps is another parameter used to train the AI engine.

With rapid enhancement on photographic capability of smartphones, the numbers of high quality and detailed property photos were vastly increased during the past decade, and this provides the data needed for capturing the entrance door, doorstep, crawlspace, basement, pier or pile and other property structure related objects. Entrance doors can be detected by AI ROI detection (as will be discussed below, especially with respect to FIG. 48-52) based on their common characteristics (such as shapes, colors, and styles). The vertical heights from the lowest side of an entrance door to the ground could be measured through a photogrammetric method. The doorstep below the door object can be also identified and the vertical height of the doorstep above the ground can be determined.

Figure 25:
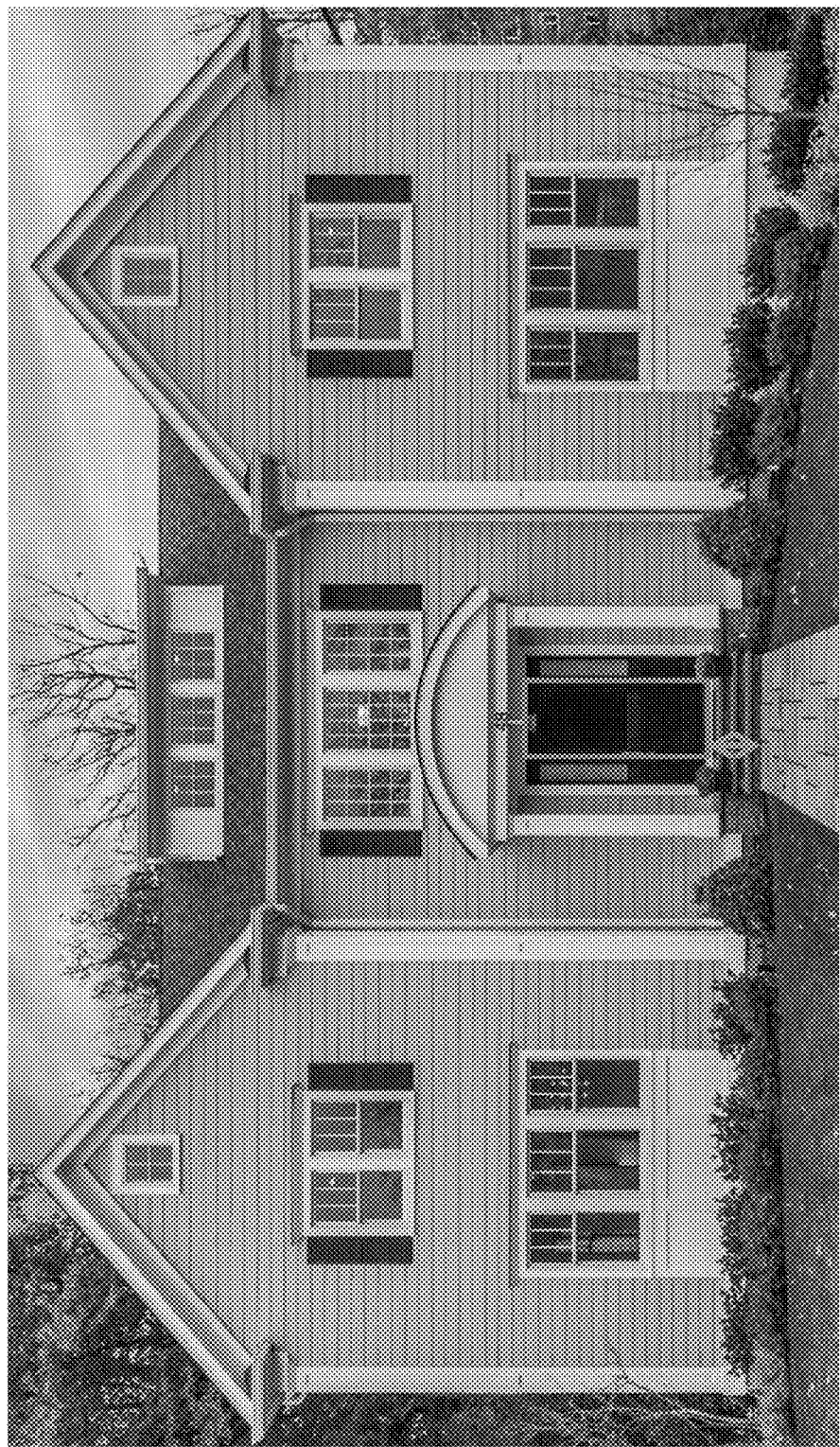
FIG. 25 is a training image of a front door object and a height measurement relative to a ground level.

FIG. 25 is an example of a front of a house with a few steps separating a ground level from a FFE, with the height being the vertical elevation of the steps and threshold (doorstep) into the house. The measurements on those two objects can be used to determine first floor heights. The entrance doors and doorsteps can be detected with different intelligence and logic, and they can be used to help validate each other. FIG. 25 presents a classic example of entrance door and doorstep, and height above ground. The ground elevation at entrance locations which are either on or adjacent to building footprint boundaries are used for computing FFEs In comparison with doorsteps, a door object contains some unique features that may give high confidence for entrance door detection, and thus used for training the AI engine to detect front entrances. The detected door objects of properties could be further validated by door accessory objects, including: door locks, including electronic locks; doorknobs; door handle sets; door knockers; door decors mailbox/slot; and other features.

Figure 26:
FIG. 26 is a training image of a front door with a detected lock, door handle, and door knocker.

FIG. 26 is an example where boundary boxes are detected around a door knocker, a lock, and a doorknob, respectively. For a residential property, door locks and doorknobs are the basic functionality of entrance doors, that is a common requirement of functioning properties. The detected door objects containing those essential door accessory features may give very high reliability of the detection. For example, only the building main entrance would have a door knocker and mailbox.

The detected door object could be further validated between two door light fixtures on both side of the door objects, one nearby light, or other combination. An entrance door should have some types of light fixtures for night access, which is a basic requirement for a functioning property.

Figure 27:
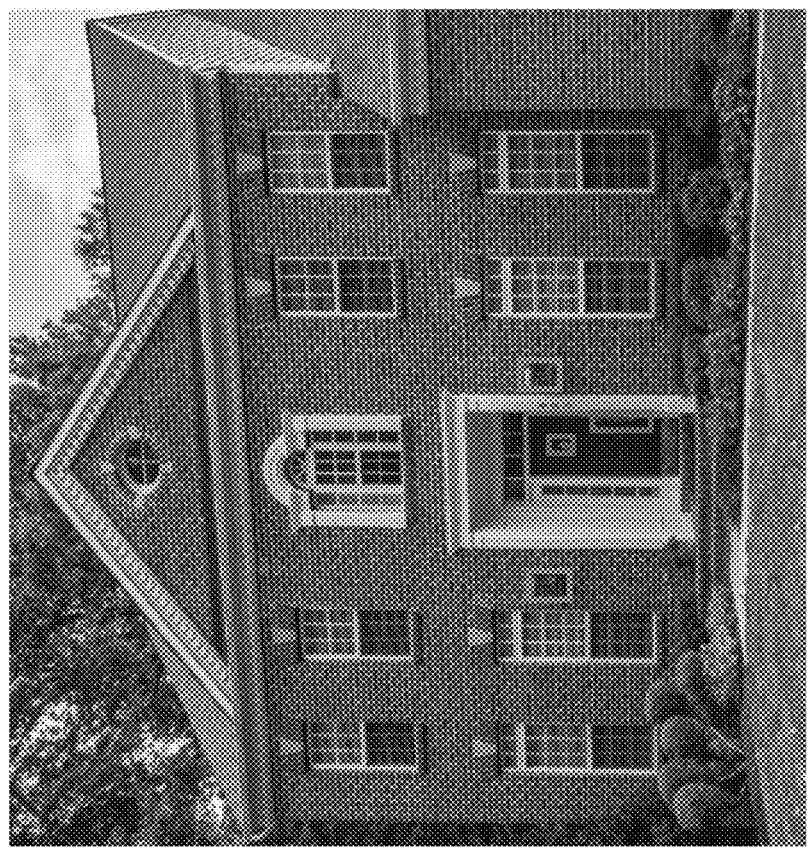
FIG. 27 is a training image of a front entrance area of a building with detected light fixtures, door knocker, and door lock.

FIG. 27 is a training image with boundary boxes around side lights, door knocker, and lockset/door-handle.

Figure 28:
FIG. 28 is an example image of night light detection.

Every household turns-on their entrance door lights daily as a common phenomenon. Lights can be observed from the sky. The aerial photo in FIG. 28 was taken by NASA's remote sensing technology (https://sociable.co/technology/nasas-black-marble-image-shows-how-stunning-the-earth-is-at-night/.) that captures city lights at night over Europe. The technology can capture images on nights with or without moonlight, producing crisp views of the earth's atmosphere, land and ocean surfaces. When light locations detected by such technology are near or on building footprints, they would give high possibility to identify the locations of property entrances. Integrating the space technology and building footprint dataset is another technological way to determine property entrance locations. As an alternative technology, the lights at night can be also detected by airborne drones. The logic for using building footprint data to filter the entrance light locations can be applied to drone technology. Similarly, detected lights that belong to specific buildings can be used for detecting main entrances. For example, streetlights separate from the lights that were mounted on the buildings (on building footprints) or very close to the buildings could be used to assist in detecting at least the intended front of the building.

A detected entrance door object can be validated by a doorbell object next to it. Some doorbells have a self-lighting functionality, that is a useful and unique feature for the doorbell object detection. As its unique purpose of use, a doorbell must be installed near the entrance door. The building door object could be detected or validated when the object is near a badge reader for commercial buildings. The security lock with keypad also belongs to this category.

Figure 29:
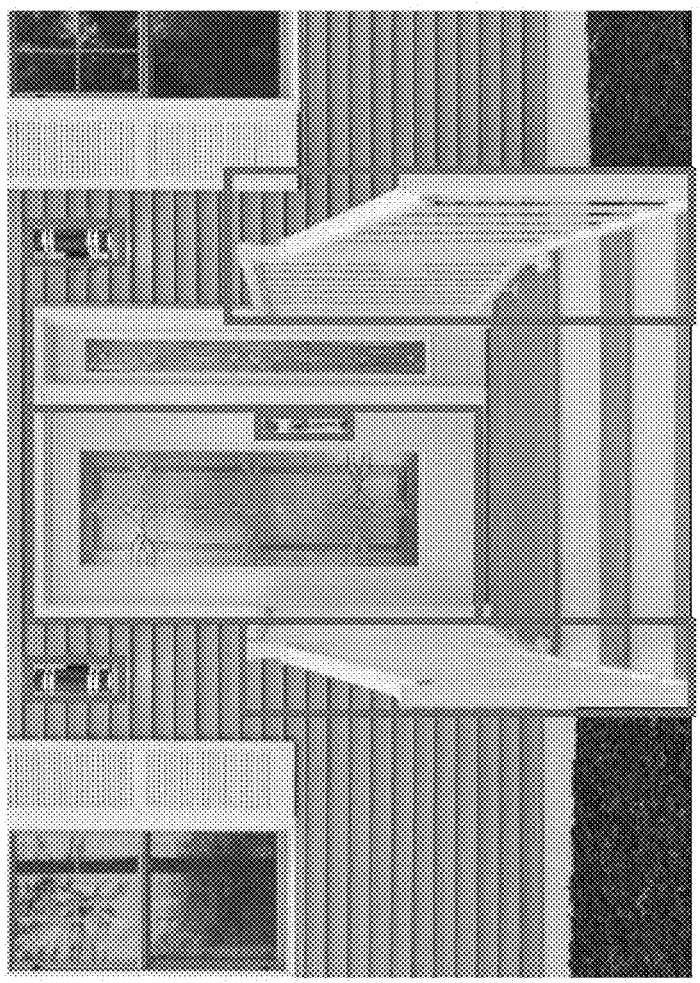
FIG. 29 is a training image of a front of a building with detected handrails next to the building entrance.

The door object could be detected or validated within two hand-rail objects. See the boundary boxes in FIG. 29 showing the detection of handrails, side mounted lights, and door handle. It is one common feature that entrance doors could have handrails, particularly elevated properties. Some elevated properties could have significant hand-rails and stairs from the ground to the first floor deck or entrance. The detection on hand-rail objects can be used to extract the lowest elevation for the entire property enclosure. The entrance objects may be detected by typical or common style shapes (such as arches, tringles, squares, and others) and designs, that may be more complex and unique than other parts of the buildings.

Directly detecting doorsteps is another effective method to determine the FFH and the entrance locations of properties, and thus used as a parameter for training the AI engine. Doorsteps have common characteristics, patterns, and styles, in which each step has an equal height and they will reach the bottom of the entrance door where the first floor is located. With the detected doorstep objects, heights of the doorstep can be measured through a photogrammetry method. The lowest doorstep should align with the ground, where the ground elevation can be extracted from a DEM dataset. By adding doorstep height on the top of ground elevations, FFEs can be determined. Again, both first floor heights (doorstep height) and FFEs are collected and stored by this technology as data elements.

The detected objects on delivered post packages can exactly sit on both the entrance doors and FFEs (as in FIG. 19A). The bottoms of those package objects represent another way to determine where the top of the doorstep or the bottom of the door are. If the height of the bottom of the package above the ground can be measured, it would be the first floor height. This method demonstrates how human activities are used by the AI engine to project FFH/FFEs. The property entrance is also the entrance for home goods, which is one of the most important function of property entrances, utilized by this technology.

When a high-accuracy and sufficient elevation measurement device (e.g., an altimeter), is available, simply deliver or place the device on the property entrance or directly on the first floor or lowest floor, and the flood elevation can be measured. The device can be a one-time use or rental device.

Figure 30:
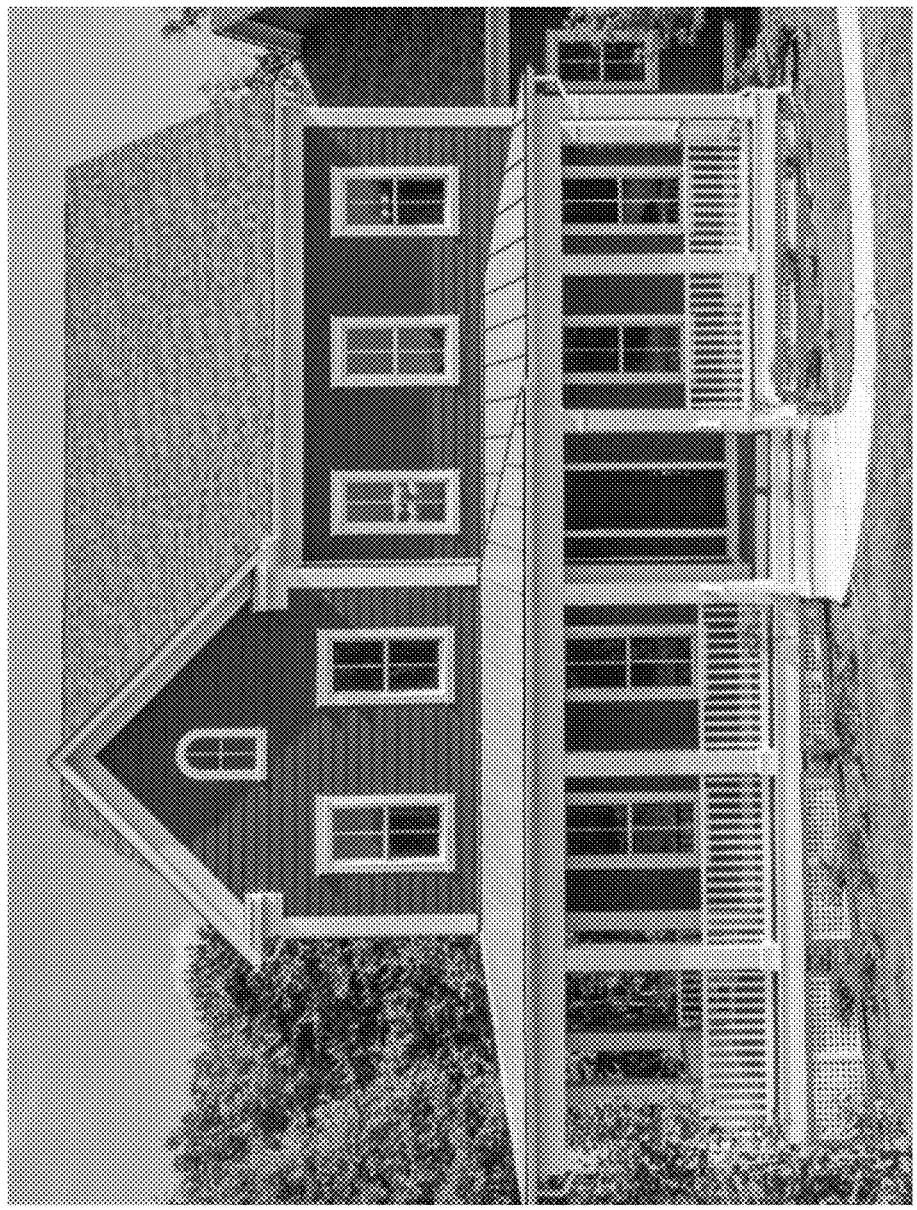
FIG. 30 is a training image of a front view of a building with identified crawlspaces below the FFE of the building.

The first floor height could be also measured if crawlspace objects can be detected and heights of crawlspaces above the ground measured, such as the crawlspaces detected with boundary boxes in FIG. 30. Combining the crawlspace height and the ground elevation, the FFE is directly derived. Properties can be elevated with a crawlspace against flooding, which is one common approach for mitigating flood inundation risk.

Figure 31:
FIG. 31 is a training image of a crawlspace area with a detected pillar showing a height difference between a ground elevation and a FFE.

The heights of crawlspaces can be determined by using object detection and photogrammetric methods, extracting from interior crawlspace photos. Commonly, crawlspace photos were collected through property inspection processes, such as that shown by the boundary box in FIG. 31.

Many properties have sub-floor windows, that indicated the structures are partially under the ground. Since the properties are partially underground, the lowest floor elevation can be simply determined by exterior photos, with additional measurements on interior structures or extrapolation logic. When sub-floor window objects were detected, the lowest floor elevation can be estimated by: determining ground elevation from digital elevation management (DEM, like that available from the national elevation dataset, NED); adding the lowest window heights; and subtracting the height measurement to basement floor or a standard height below basement window. First floor heights could vary with different types of foundation types (such as Slab, Crawl Space, Crawl Space—Unexcavated, Basement—below Grade, Basement—Daylight, Basement—Walkout, Piers, Hillside, and others). The foundation type information from a property database can be used as one key parameters in first floor height determination. Standard first floor heights with additional modifiers specified in this application can be applied to the properties in the nation.

With the information, an estimate of the lowest floor elevation is calculated. FIG. 32A shows an image of a standard height of a basement window, and its height relative to a basement floor. FIG. 32B shows an image with a related basement window flush with the ground, while FIG. 32C shows a basement window detected with an offset height relative to the ground. The similar method can be also applied to detect objects that lead to identify the walkout basement.

Figure 33:
FIG. 33 is a training image of an elevated property.

When a vehicle is detected below the building entrance, most likely, the structures were elevated; when the vertical space below the building entrance is open, height support objects (such as poles) for the structure can be used to determine first floor heights. FIG. 33 shows an example of boundary boxes around vehicles below a house. Other structures (an air conditioner on the left, and a box on the right) are also detected as regions of interest in FIG. 33. By adding the ground elevation into the height of support objects, the first floor/lowest floor elevation can be determined.

When a property was elevated, associated utility units are be elevated to the same elevation where the building platform is too. If a utility unit (such as an air-conditioning unit, see boundary box on the left in FIG. 33) near the building footprint is detected and its height is significantly above ground, the heights of the utility units can be used as supporting a physical fact for the first floor determination.

The building construction types, foundation types and floor type information, for example, can be used to estimate first floor heights based on the design specifications on those components. An example foundation type code is presented in FIG. 40. Furthermore, materials for constructing foundations can be used for enhancing the FFH calculation because of their structure engineering characteristics. Foundational type information may not be available for all properties in the US. A statistical model is used based on similarities in property characteristics and terrain conditions from nearby neighborhoods for extrapolating missing foundation information. Aggregated statistical data from a radius area of properties with known foundation types, or at ZIP code & ZIP Plus 4 level can be useful as an alternative approach. Building codes (such as design floor elevation) could vary with different geographical areas, particularly political regions (such as states and counties) and land areas (such as inland and coastal areas). Therefore, geographic variations on building codes can be considered in the first floor height determination. The national database for building codes and design floor elevation or height can be developed for facilitating FFH computation. Some information on the structure specifications could be collected and validated through home inspection and appraisal process, such as the CoreLogic database that includes appraisal information.

The garage type (such as basement garage, first floor garage, and so on) in the property information database can be used to estimate the first floor heights by using garage dimension information. Garage position relevant to the building entrance can be also measured by using AI object detection technology from property photos. Garage doors normally have standard dimensions for one, two, and three cars. In addition, if the driveway object can be extracted from aerial photos, the driveway will connect to garage doors.

Detailed garage information in the property database can be very useful for deciding garaging positions and dimensions, so that the first floor and lowest floor elevations can be derived. The example information related to garages is listed FIG. 39.

Figure 34:
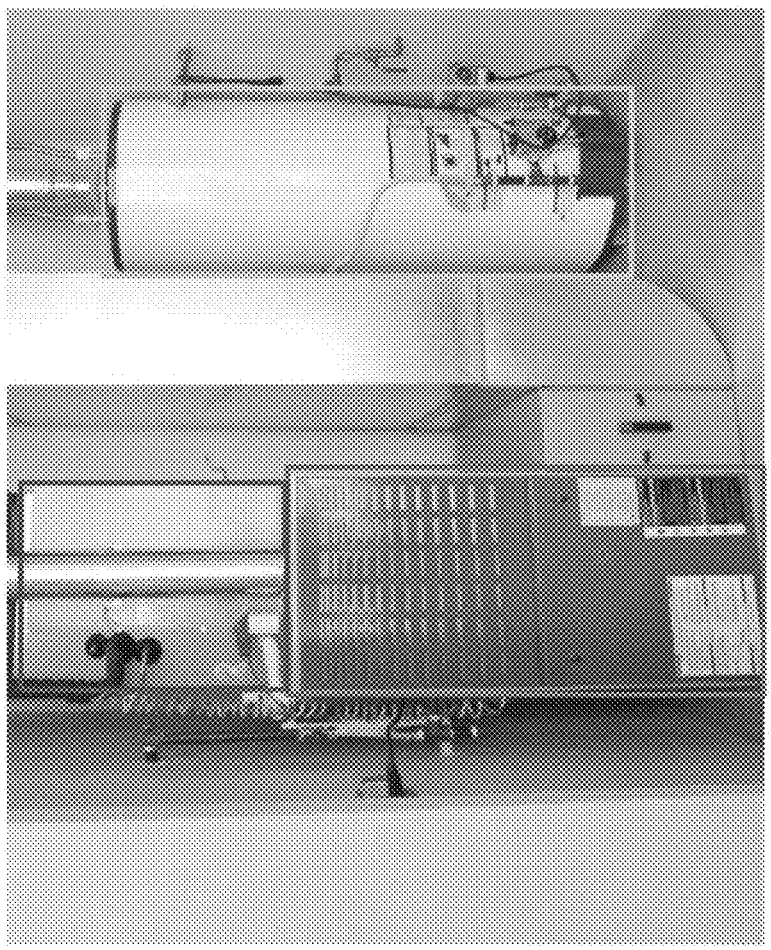
FIG. 34 is a training image of heating and air conditioning appliances.

Machinery and equipment objects can be also detected by the object detection technology. FIG. 34 shows the detected boiler, furnace, and air-conditioning components. If the floor where those detected equipment objects sit is determined, lowest floor elevation can be assigned to the equipment, so that they can be used on flood damage assessment. The information could be extracted from the property database or property inspection reports, which may indicate the floor where utilities were installed.

The first floor height could also vary with year built, structure types and changes on construction cost, materials, technologies with the time. Many modern building codes may not be implemented in old days. Therefore, age of buildings/time built could be factored into the first floor height calculation. For example, a structure built in 50's could have a significant first height comparison with new constructions. Therefore, the year built information on the structures is an important attribute for the FFH determination.

The first floor elevation was also regulated by flood elevations if structures were built in Special Flood Hazard Areas (SFHAs), defined by the federal government. Sizes of additional freeboard above the Base Flood Elevation (BFE) and other considerations from builders also affect the first floor heights. Therefore, the vertical relationship between BFE and LAG at the structure is valuable information for projecting how high the structure should be elevated if the structure was built after the initial date that FEMA flood insurance rate map (FIRM) data became effective. For example, the first floor was constructed on the top of the garage for a property in the oceanfront, that could elevate the first floor above BFE+freeboard and create more usable space. Those data elements described above were fully used in the FFH projection model for considering federal, state and local flood regulations on flood mitigation. The information from Community Rating System (CRS) for mitigating flood risk can be considered as fact on the first floor elevation determination. Hence, the Pre-FIRM and Post-FIRM conditions have their influence of first floor heights because not all properties were elevated, depending on when the original FEMA map panels were issued.

Figure 35:
FIG. 35 is a diagram showing a FFE relative to a lowest (below) floor elevation.

Determination of Lowest Floor Elevations by Using Photogrammetry on Interior Property Photos and Property Database The most important objective on floor elevation determination for flood risk assessment is the lowest floor elevations, where would have the deepest water inundation. The insurance companies and governments may require to directly use the lowest elevation or indirectly derive them from FFEs. The lowest floor elevations may not be directly detected from exterior property photos if properties contain sub-floors, the floors below FFEs. Therefore, interior property photos and comprehensive databases for property characteristics would be needed for the assessment, like that shown in FIG. 35, showing a subterranean basement level 3501 only accessible from a set of stairs to the main level 3503.

It is to be noted that FFEs can be the lowest floor elevations if underground structures do not exist. When the window objects are detected and their positions below house entrance, the properties could have a split level or basement. When properties are detected with sub-floors, the process for determining the lowest floor elevations has to be conducted. For this case, the height of sub-floor below the first floor needs to be obtained.

Figure 36:
FIG. 36 is an image of a basement and a height between a floor of the basement and a ceiling of the basement.
Figure 37:
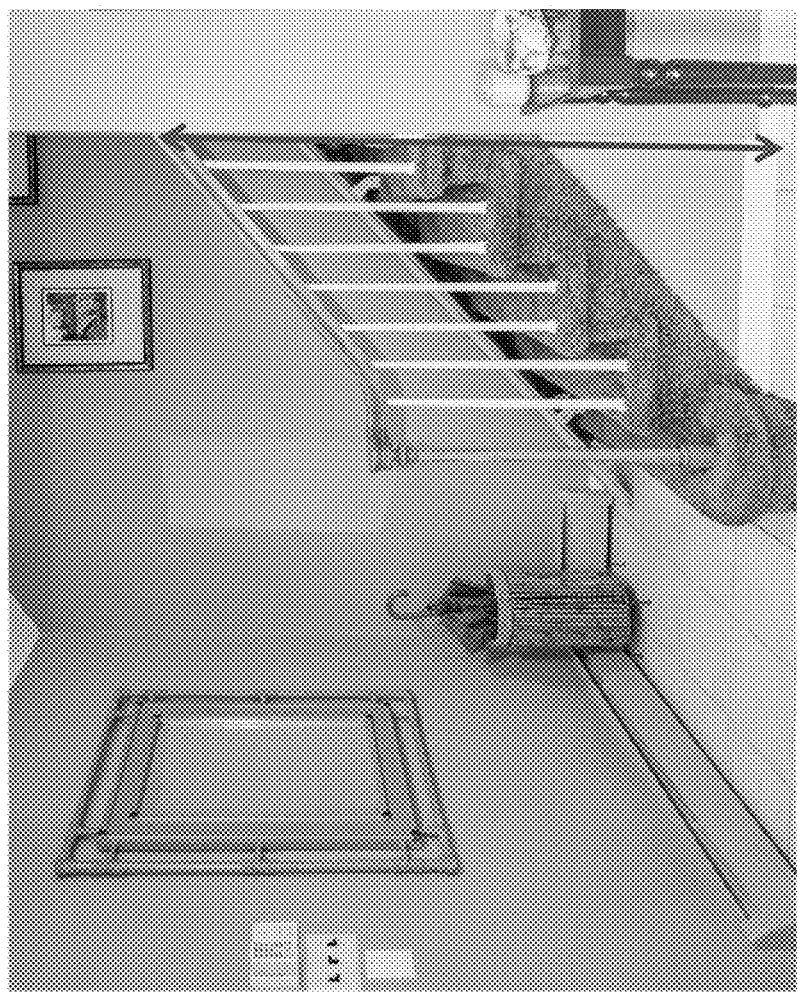
FIG. 37 is a training image of an interior of a split level house.

The lowest floor elevation can be determined by using derived FFE and measured basement dimension abstracted from basement photos, like that in FIG. 36. Lowest floor elevation=FFE−Sub-floor Height Referencing to the basement, the FFE becomes the next higher floor elevation. Providers may use different terminology in the insurance pricing. The lowest floor elevation can be determined by using derived FFE and the derived floor height from photos on the split-level style properties, like that shown in FIG. 37.

Figure 38:
FIG. 38 is a training image of an exterior of a split level house.

Split-level style properties with sub-floors can also be identified when the ground elevation at the building entrance is substantially higher than the elevations at other points on the building footprint boundary. For example, the property presented in the training image of FIG. 38 has elevations on the right side of the building which are much higher than on the left side of the building, where LAG is located. Therefore, the elevation variance between the lowest point and the highest point on the building footprint (difference between LAG and HAG) can be used to auto-detect the split-level style properties when the elevation variance exceeds a certain threshold.

Split-level style properties and properties with basements can be also identified by using the property information database that is associated with building footprints and property parcels. Example story codes for split style properties are listed in FIG. 41.

The lowest floor elevations can be derived by subtracting heights for those sub-floor components (such as basement) from FFEs/FFHs. Specific heights could directly come from the property database or could be estimated by typical design specifications.

Many new communities may be built uniformly in terms of their design specifications on the foundation types. Previously determined floor height specifications above the ground for some individual properties can be applied to the same community when property design specifications are matching. For example, if houses built in a street block or an entire community have a uniform 0.75 ft. doorstep height, FFEs for other buildings in the neighborhood could be equal to 0.75 ft.+ground elevation at any targeted property. The method is to try using the similarity on property information for effective floor elevation determination. The results from this similarity method could be validated by the methods described in previous sections.

Using Building Footprint Data and Side-Mounted Original Vehicle Camera to Capture Doorstep Height/FFEs As described above, acquiring elevation certificates for properties is expensive. Some expensive equipment & technologies (such as LiDAR) were tried to apply to capture the doorstep height/FFEs by shooting lights at doorsteps from driving vehicles. The LiDAR technology, for example, sends light to buildings and receives reflected light to determine distances to the targets and other measurements. Because of the cost of such survey technology, it was not broadly used for the property information collection.

In this disclosure a new method is described regarding how to use ordinary cameras (such as from smartphones) to determine doorstep heights. The core difference is to use building footprint datasets to facilitate distance computation between the targeted buildings and moving vehicles without requiring the equipment for receiving reflection from the targeted objects (such as doorsteps). With the new method, the cost for acquiring floor elevation determination would be significantly reduced.

Figure 42:
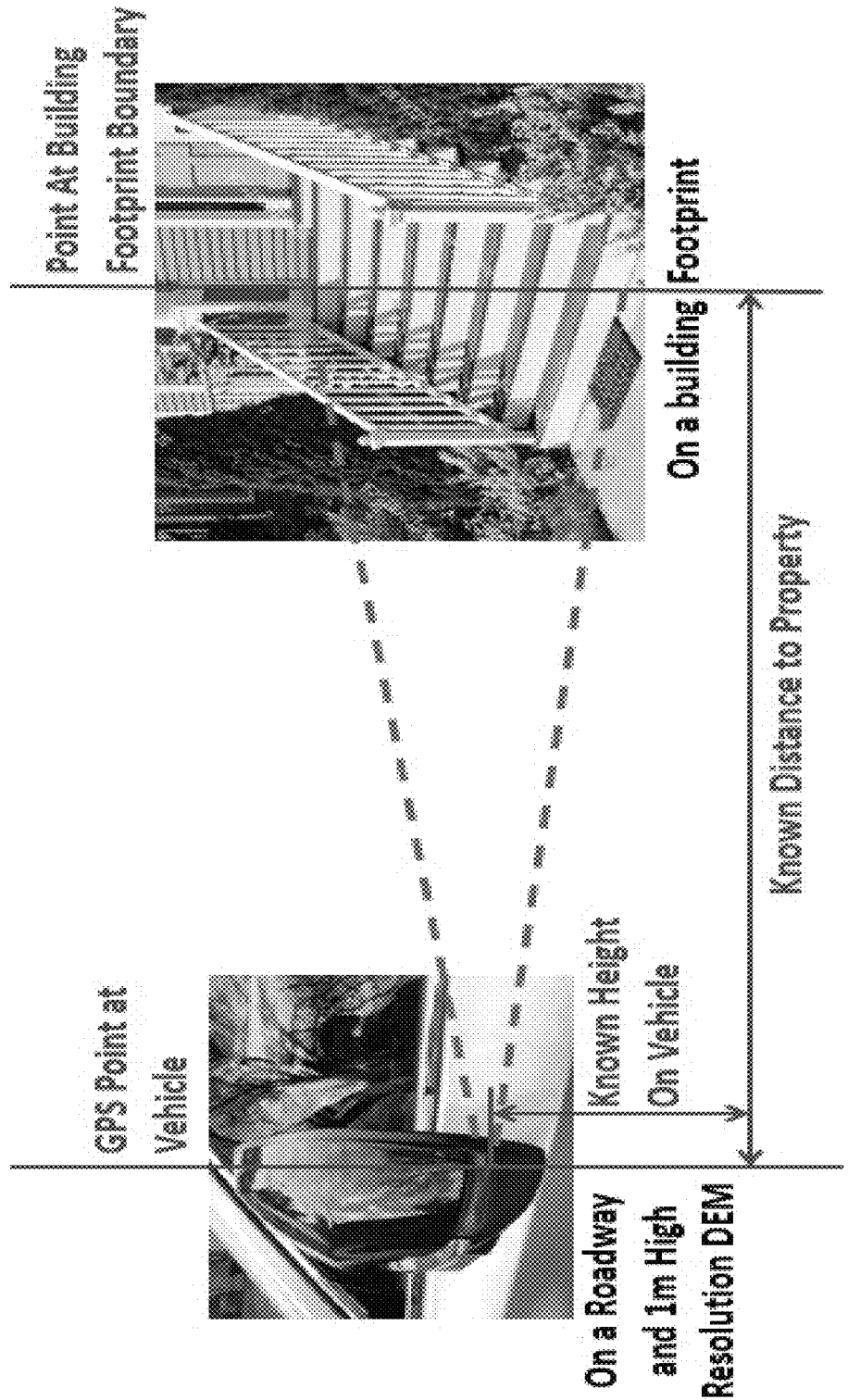
FIG. 42 is a diagram showing relative heights and distances between a vehicle and a front of a building of a property.

In above sections, methods were discussed for automatically detecting entrance locations. The entrance door point at a building footprint boundary and GPS point at the driving vehicle give the distance between the vehicle and the targeted building. The distance between two points can be used to automatically compute the scale factor between the object on the photo and actual object, so that expensive equipment relying on light reflection is not needed. FIG. 42 shows an example of this where the vehicle is on a roadway at a known height with a known GPS point on the vehicle. Likewise, the distance to the property from the vehicle is known. With using the building footprint data, any passing vehicles with regular cameras (such as cameras from smartphones) can capture the information. The high resolution DEM (such as 1-meter USGS DEM) can be also applied to ensure the accuracy of elevation measurements.

Figure 43:
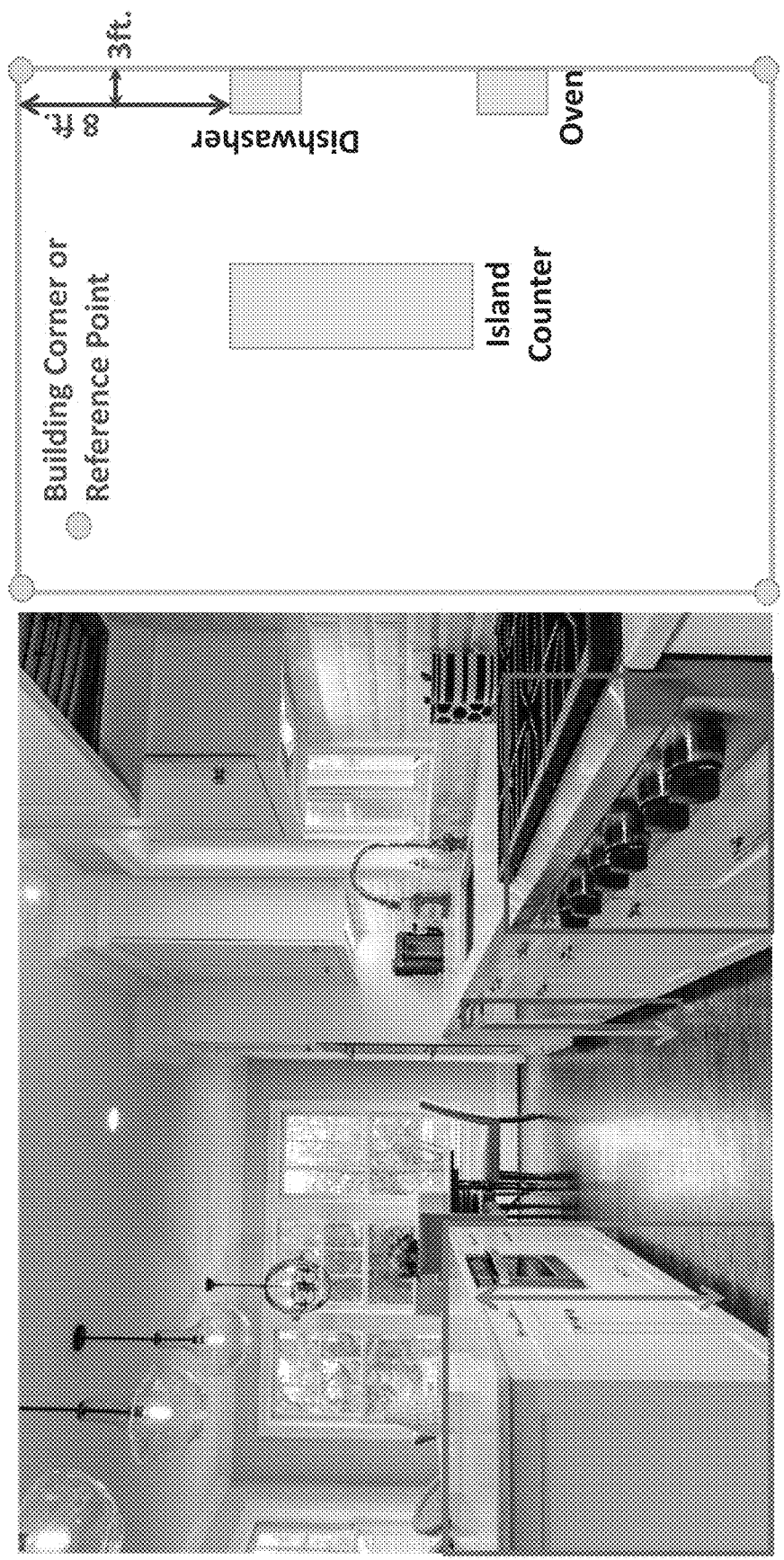
FIG. 43 is an image of detected features in a kitchen and a corresponding plan view of the detected features in an object diagram.

Determining Floor Elevations by Geospatially Enabling Digital Contents Inside Properties With today's AI object detection technique and digital video & photos, the contents inside properties could be detected and recognized. Since those detected objects are contained within the building footprints, those content objects can be automatically georeferenced by correlating them with boundary points (on walls) on building footprints through photogrammetric measurements. As demonstrated in FIG. 43, the northeastern corner of building has the real-world coordinates (latitude, longitude). By adding the distance offset to the building corner where the dishwasher is located, for example, the real-world coordinates would be derived and assigned to the dishwasher (red boundary box) inside the building. The procedure can be applied for all detected contents within the building footprints, so that all detected content objects can be georeferenced and mapped. Commercially, mapping a certain brand of dishwashers in a geography, for example, could have profound commercial values:

Map geographic distributions of certain types of home goods inside properties

Map geographic distributions of certain brands of home goods inside properties

Map geographic distributions of quantity of home goods inside properties

Map geographic distributions of ages of home goods inside properties

Map geographic distributions of styles of furniture arrangements inside properties Map geographic distributions of home interior design and upgrades inside properties Map geographic distributions of overall home content values inside properties Geometric relationship between the entrance location and the corner of the structure on the building footprint can be measured from the inside of the structure by using smartphones with proximity sensor and other measurement tools. The methods can be also applied to geospatially enable all contents (such as appliances, furniture, and so on) in the inside of the structure.

The floor plan of structures (like that shown in FIG. 22) can be georeferenced to line up with building footprint geometries. After a floor plan is referenced, detailed dimension measurements from the structure design can be used to facilitate geospatial correlation, for example, between entrance door and building corners. CoreLogic had developed a technology to generate accurate floor plan from 3D video data.

Figure 44:
FIG. 44 is a training image of an elevation adjustment from an elevation enabled device by object height.

When an elevation measurement enabled device 4401 is placed on the top of detected objects (such as a countertop), the floor elevation can be determined by subtracting the height of the object (see FIG. 44). The elevation enabled devices can be:

A mail letter or a package is sent to the address of the properties, that contain the device has the technology that accurately determine elevations on a common vertical datum.

The device can be for one-time use.

The device can be a rental.

Smart phones, that may be enhanced with advanced elevation technology.

Smart watches, that may be enhanced with advanced elevation technology.

Smart eyewear, that may be enhanced with advanced elevation technology.

Furthermore, the detect objects inside building footprints include people. Today, technology has reached the capability for human face recognition. Therefore, phone devices in human hands, watches on the arms, and eyeglasses on faces from persons in properties would be relatively easy objects to be detected and relative heights above the floor can be measured in a reliable manner. For example, when reading elevation data from the smartphone, the height above the ground can be measured by using photos or videos, so that elevation from the phones can be corrected to the floor level.

If the flood inundation photos are available, dimension changes of detected content objects with and without water inundation can be used for directly and accurately calculating water depth above floor elevation inside inundated properties. The auto-detected water depths can be applied for flood insurance claims and flood loss computation. In general, after the content objects inside properties are digitally captured, object changes from the impacts and interruptions of natural hazard events can be used for hazard loss assessments.

Figure 45:
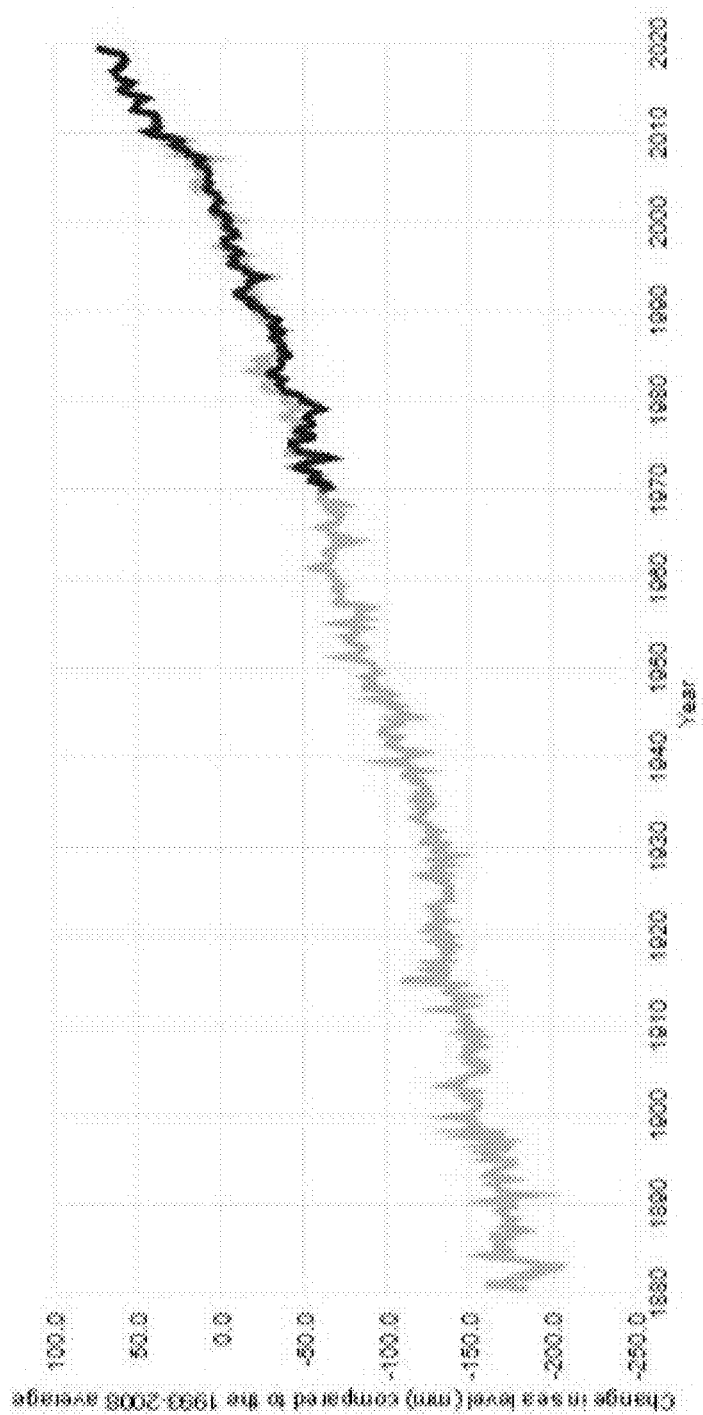
FIG. 45 is a chart of global sea level rise.

First floor height could vary with future conditions of natural hazard impacts. The chart below shows NOAA observations on global sea level rise (https://www.climate.gov/news-features/understanding-climate/climate-change-global-sea-level) since 1880 (See FIG. 45). The FFH can be designed based on future conditions of the sea level rise. Therefore, the climate model for projecting sea level rise can be considered as a component for FFH determination.

The first floor heights can vary with many property characteristics. The correlations between first floor heights and property characteristics could be established by conducting statistical analysis on the national property database with millions of property records and comprehensive property attributes, including appraisal and MLS databases. The image presented below shows rich information captured by CoreLogic technology, that can be used for FFH determination too. FFH=Function (Property Characteristics, Land Characteristics)

Construction costs, affordability, community styles can be additional factors in FFH determinations. For example, a luxury property could have its own category and customized specifications on the foundation and FFH design. Those economic factors could be considered in FFH computation and modeling. CoreLogic has reconstruction cost data for all properties in the United States, that can be directly used in the FFH modeling.

Traditionally method for determining FFHs through expensive land surveys was only referencing to the lowest adjacent grade. This innovated location based FFH methodology allows AI technology to extract FFHs from any angles and any directions (such as front, back, side, as well as from the roof too), having a great flexibility and adoptability Traditionally method for determining FFHs through expensive land surveys was only referencing to the lowest adjacent grade. This innovated location based FFH methodology allows AI technology to extract FFHs from any angles and any directions (such as front, back, side, as well as from the roof too), having a great flexibility and adoptability of the new technology. There are many fenced houses and communities in the country. For those properties, only property-front imageries could be available. Therefore, it is important to have the flexibility for FFH extraction of the new technology.

There are many fenced houses and communities in the country. For those properties, only property-front imageries could be available. Therefore, it is important to have the flexibility for FFH extraction.

This disclosure has developed a significant amount of intelligences to detect targeted objects of properties and facilitate floor elevation determinations. The floor elevations (such as the FFEs and lowest floor elevations) can be measured, derived, and validated by multiple methods for ensuring the reliability of the measurements. Building footprint geometries play a very important role to ensure correctness and efficiency of the floor elevation determination. The technology uses human behavior (timing and frequency) crossing building footprint boundaries for automatically determining locations of property entrance, that bring a new dimension into the object detection technology.

The technology enabling georeferenced content objects within building footprints have great commercial market values, assigning real world coordinates to the detected home contents inside properties. As today, 99.9% of home contents have no GPS capability. With this technology, they will receive reliable real world geocodes, making them mappable. Geospatially enabling the contents inside structures can effectively help to flood damage assessment on the content because we know whereabouts of the contents.

Because high resolution elevation dataset and property photos and video are used in the process, the desired precision of elevation measurements can be reached, so that costs on manual elevation surveys and certificate acquisitions can be saved. Dimensional changes on previously detected content objects within properties from photos with flood water inundations can be used to determine flood depth for insurance claims and flood loss validations. As result, costs for flood risk assessment on properties and flood insurance policy purchases can be effectively reduced. The technology can be used to promote growth of flood insurance market and the reduction of financial impacts when future flood disaster occurs. Fundamentally, the technology can significantly increase the accuracy of flood loss estimation of analytical models.

Application of AI Engine

AI plays an important role in discovering and identifying the house structure and substructure. Semantic segmentation method will be used to identify at a pixel level, what is a door, what is part of these steps, and what is potential structure below the assumed first floor, i.e. the door. Labeling a large number of property photos at pixel levels and build training data comprising of doors, doorsteps, patios, exterior walls, etc. based on comprehensive collection of property photos and training data comprising doors, staircases, etc. Using the data to construct an AI model for the first floor height extraction.

The surrounding components of street concrete or lawn/garden are also used for the first floor height determination. There are a number of different methods to collect this information.

As discussed with respect to FIG. 42, the first is to triangulate based on additional data such as a street view, and try to extract based on known door heights and measured directly in the image where we can correlate pixels to inches. As an option, it is possible to locate the front door or first floor, on the digital elevation model, which combined with the footprint should give us an idea of the elevation of the surrounding property of the house. A machine learning model is used that allows to identify common door and other structure heights to estimate at first floor height, in addition to sub first floor.

There are two ways to accomplish approach. The first is to identify each of the pieces separately, and try combine them at the end. This might be a brute force approach of recording all of the steps, that is to say identify door pixels, step pixels, sub floor pixels, estimate each of the heights individually based on known norms in the region, and provide those. A second approach is to take a full model approach, where a set of ground truth (GT) outputs are provided for the model, and train into end solution which is capable of determining the entire set of desired outputs within a deep learning model. Such approaches have been shown to be the most effective ways to model multiple sensors, or data inputs. This approach will be discussed in more detail below. This would allow the process to take advantage of available data sets, such as Corelogic's extensive property database when making determinations, and not relying solely on what is available in the visual image.

Figure 46:
FIG. 46 is a training image of a front of a house with bounding boxes as part of a semantic segmentation of the image.

FIG. 46 is an image of a front of a house with sematic segmentation, identifying regions of interest the forms of a basement window, a staircase, and a front door. DSM (digital surface model) generated from a lidar scan is used to create a ground truth for the height of the building and the surrounding grounds. Once the depth map is extracted from the DSM, a CNN is trained to predict new depth maps. These depth maps are then used to measure heights from building surfaces and the ground. The pre-existing imageries can be aligned to 3D measurements on the structures and land surface for calculating relative dimensions of detected objects and deriving the first floor heights.

With the technology, FFHs can be also defined by referencing roof elevations too, that is another innovated way to for FFH determination. In this approach, ground elevation may not be necessarily needed. If the building height was used for FFH extraction, the location of the height measurement will be captured. Roofs of buildings may be flat either, particularly true for majority of residential properties. Therefore, location-based FFH determination is very important.

Interior imageries, room dimensional measurements, 3D room design models and other interior property information can be also conjunctionally used with information described above for determining first floor heights and lowest floor elevation (such as basement). For a single floor structure, for example, if the building height and elevation are available, the first floor elevation can be estimated by subtracting the room height from building/roof elevation.

The present disclosure may be embodied as a system, a method, and/or a computer program product. The computer program product may include a computer readable storage medium on which computer readable program instructions are recorded that may cause one or more processors to carry out aspects of the embodiment.

The derived first floor heights can be validated by property imagery, aerial photos, street view tools, and site visiting and surveys. For example, floor information documented in Elevation Certificates can be used for the validation purpose. The AI based FFH measurement can be considered as observation/physical data, it would be used to replace FFH values derived from other method (such as from foundation type).

Figure 47:
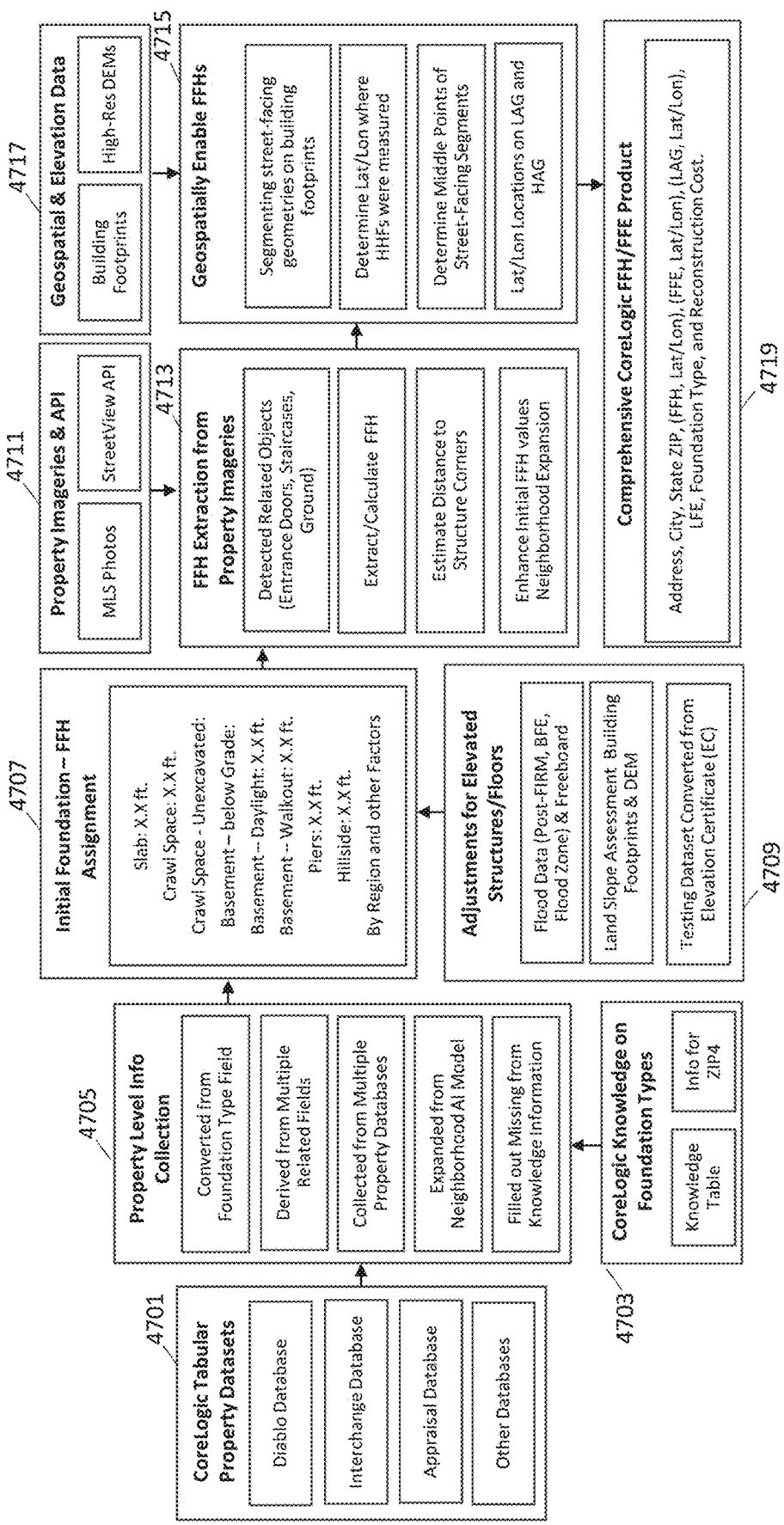
FIG. 47 is a dataflow of how different information is fused to obtain FFH/FFE data for respective properties.

FIG. 47 is a diagram of related resources available to for determining the FFH/FFE of buildings in particular properties and recording them in a data structure, along with a vast array of other buildings for other particular properties. The ultimate resource is a database of FFH/FFE information for particular properties, as shown in 4719, which includes Address, City, State ZIP, (FFH, Lat/Lon), (FFE, Lat/Lon), (LAG, Lat/Lon), lowest floor elevation (LFE), Foundation Type, and Reconstruction Cost, for each property. This information is then accessible for homeowners, insurance underwriters, appraisers and the like for assessing the possibility of flood damage for the particular property.

Tabular property databases 4701 are available from Corelogic which provide vast volumes of building/property specific information for properties across the US. In addition to real estate specific databases, such as Diablo, and Interchange, which provide building feature characteristics, and building reconstruction costs for individual properties, other databases are available such as Corelogic's appraisal database that provide property characteristic data and cost data to help assess cost damage due to the extent of flood damage as discussed above. The building cost information may be obtained via recorded information or calculated from an automated valuation model (AVM), such as Corelogic's AVM (https://www.corelogic.com/landing-pages/automated-valuation-models.aspx). The data from these databases, and AVM are merged with foundation type information 4703 also stored in Corelogic databases such as ZIP4 and Knowledge table (example foundation information is also shown in FIG. 40) in 4705, and then an initial FFH assignment is made in 4707, with input from adjustments made based on information in 4709 regard flood data, land slope, building footprint, and DEM, as well as a testing dataset converted from an elevation certificate, if available. This results in a standard format for the initial foundation assignment in 4707. This initial FFH is then adjusted by AI engine input in 4713, which combines the data from 4707 with property image data collected from multiple listing service photos and Streetview API 4711. This AI adjusted FFH is provided to 4715, where it is combined with building footprint and DEM data from 4717 to provide Geospatially enabled FFH in 4715, which in turn produces the data structures shown in 4719.

The methods and systems described herein may be implemented using computer programming or engineering techniques including computer software, firmware, hardware or any combination or subset thereof, wherein the technical effects may include at least one of: system and method that is configured to use ground truth images of features of a building to train a CNN, and apply the trained to new images to determine a FFE in a property. Examples of Moreover, various photogrammetric methods are described herein that estimate from photos entrance doors, doorsteps and other features at a residence that suggest the location of a FFE. Various ground truth photos are used to train the CNN with features detected in the photo, such as a door. A rule used in training the CNN is deriving a scale factor by comparing a number of pixels on the detected object (e.g., a door) in the photo against a ground truth photo with a known door size (in absolute terms and in a pixel space) as well as an actual standard door dimension.

Hereinafter, how a computing device 100 calculates a main floor height, which is a vertical distance in the real world, between a ground and a lower boundary of an entrance door, will be explained.

Figure 48:
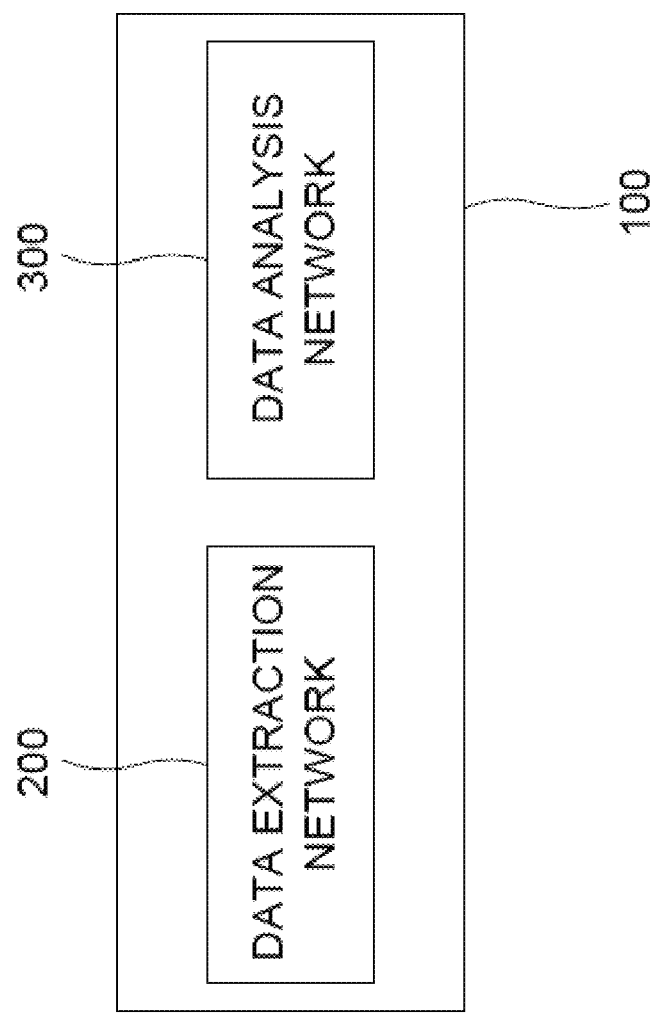
FIG. 48 is a data extraction and data analysis network of a computing device according to an embodiment.
Figure 49:
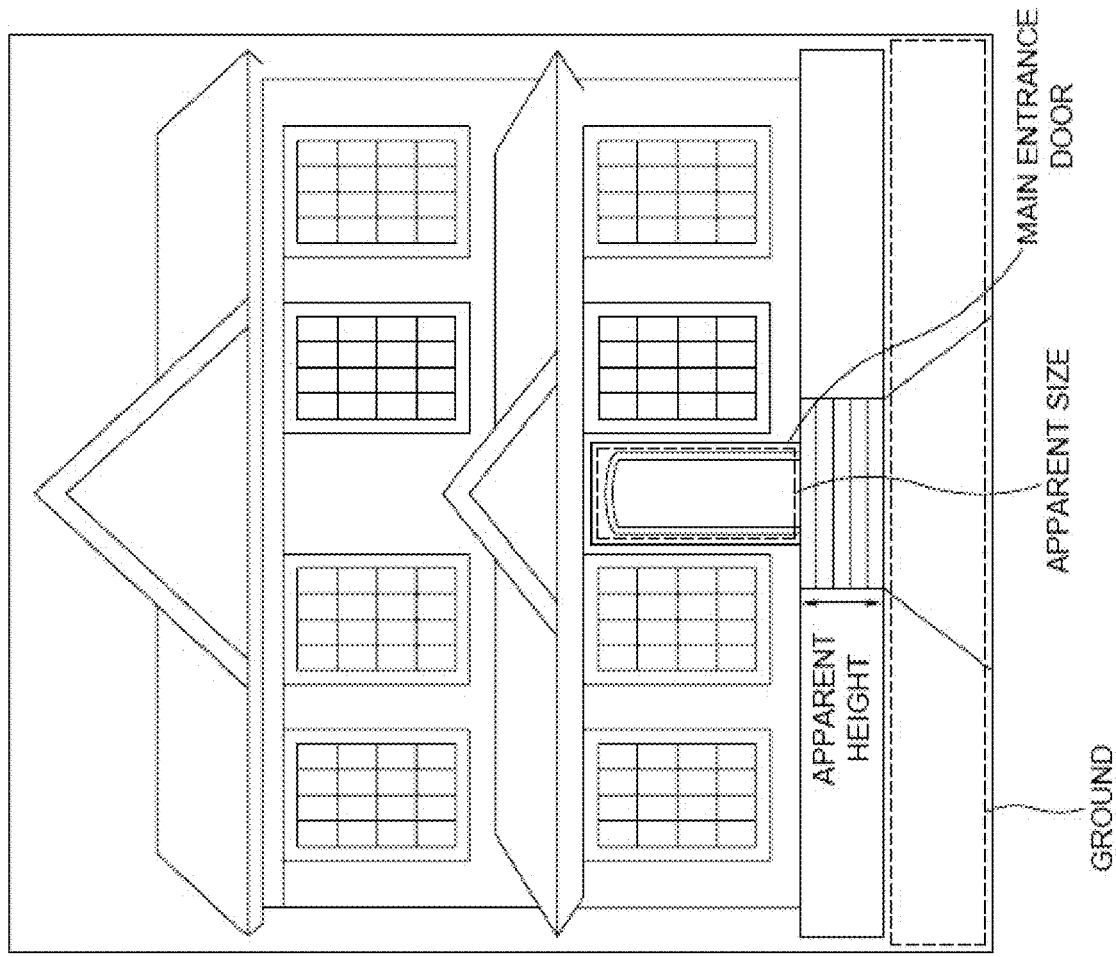
FIG. 49 is an example of at least one subject image that will be used to generate a source vector according to an embodiment.

First, by referring to FIG. 48, a configuration of the computing device 100 will be explained.

The computing device 100 may include a data extraction network 200 and a data analysis network 300. Further, to be illustrated in FIG. 50, the data extraction network may include at least one first feature extracting layer 210, at least one Region-Of-Interest (ROI) pooling layer 220, at least one first outputting layer 230 and at least one data vectorizing layer 240. Also illustrated in FIG. 51, the data analysis network 300 may include at least one second feature extracting layer 310 and at least one second outputting layer 320.

Below, specific processes of calculating the main floor height will be explained. To begin with, a first embodiment of the present disclosure will be presented.

First, the computing device 100 may acquire at least one subject image. By referring to FIG. 49, the subject image may correspond to a scene of a subject house, photographed from a front of the subject house, including an image of a main entrance door of the subject house and an image of a ground below the subject house.

After the subject image is acquired, in order to generate a source vector to be inputted to the data analysis network 300, the computing device 100 may instruct the data extraction network 200 to generate the source vector including (i) an apparent height, which is a distance between the ground and a lower boundary of the main entrance door on the subject image, and (ii) an apparent size, which is a size of the main entrance door on the subject image.

In order to generate the source vector, the computing device 100 may instruct at least part of the data extraction network 200 to detect the main entrance door and the ground on the subject image.

Specifically, the computing device 100 may instruct the first feature extracting layer 210 to apply at least one first convolutional operation to the subject image, to thereby generate at least one subject feature map. Thereafter, the computing device 100 may instruct the ROI pooling layer 220 to generate one or more ROI-Pooled feature maps by pooling regions on the subject feature map, corresponding to ROIs on the subject image which have been acquired from a Region Proposal Network (RPN) interworking with the data extraction network 200. Furthermore, the computing device 100 may instruct the first outputting layer 230 to generate at least one estimated ground location and at least one estimated main entrance door location. That is, the first outputting layer 230 may perform a classification and a regression on the subject image, by applying at least one first Fully-Connected (FC) operation to the ROI-Pooled feature maps, to generate each of the estimated ground location and the estimated main entrance door location, including information on coordinates of each of bounding boxes. Herein, the bounding boxes may include the ground and the main entrance door.

After such detecting processes are completed, by using the estimated ground location and the estimated main entrance door location, the computing device 100 may instruct the data vectorizing layer 240 to subtract a y-axis coordinate of an upper bound of the ground from a y-axis coordinate of the lower boundary of the main entrance door to generate the apparent height, and multiply a vertical height of the main entrance door and a horizontal width of the main entrance door to generate the apparent size.

After the apparent height and the apparent size are acquired, the computing device 100 may instruct the data vectorizing layer 240 to generate at least one source vector including the apparent height and the apparent size as its at least part of components.

Then, the computing device 100 may instruct the data analysis network 300 to calculate an estimated main floor height by using the source vector. Herein, the second feature extracting layer 310 of the data analysis network 300 may apply second convolutional operation to the source vector to generate at least one source feature map, and the second outputting layer 320 of the data analysis network 300 may perform a regression, by applying at least one FC operation to the source feature map, to thereby calculate the estimated main floor height.

As shown above, the computing device 100 may include two neural networks, i.e., the data extraction network 200 and the data analysis network 300. The two neural networks should be trained to perform said processes properly. Below, how to train the two neural networks will be explained by referring to FIG. 50 and FIG. 51.

Figure 50:
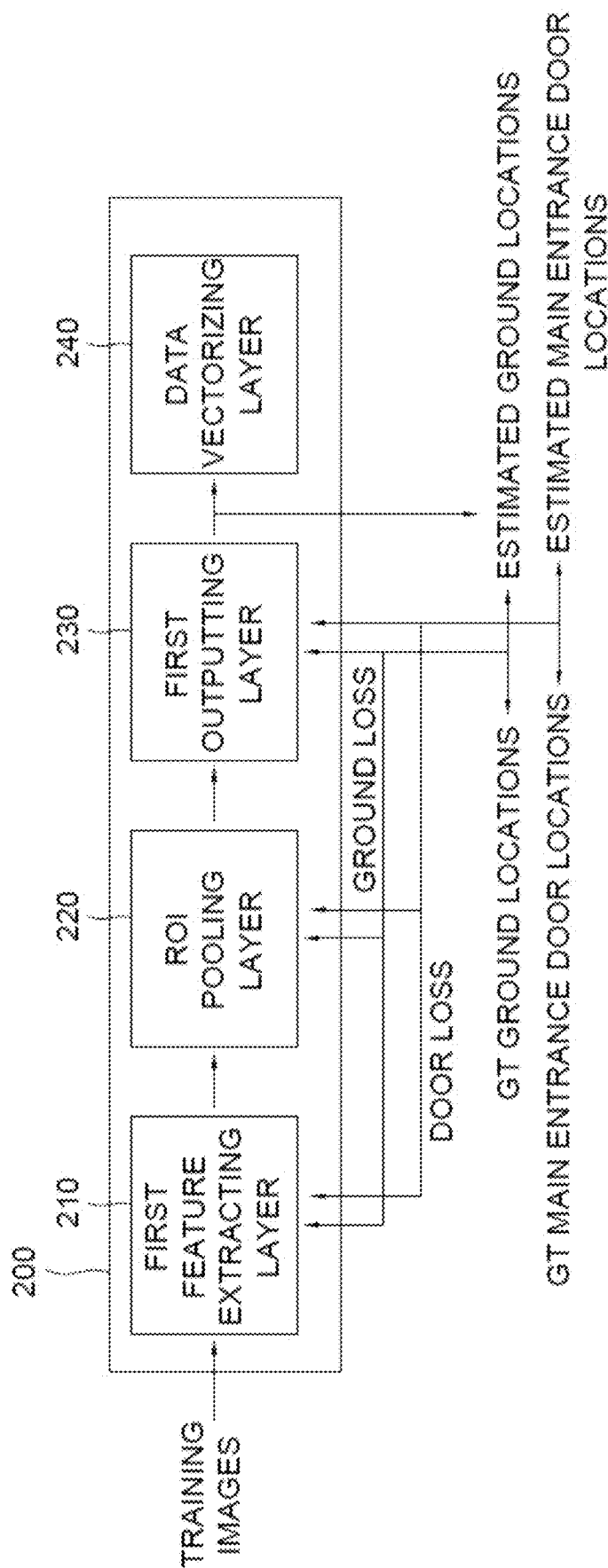
FIG. 50 is a diagram of a data extraction network according to the present disclosure.

First, by referring to FIG. 50, the data extraction network 200 may have been trained by using (i) a plurality of training images corresponding to scenes of subject houses for training, photographed from fronts of the subject houses for training, including images of their corresponding main entrance doors for training and images of their corresponding grounds for training, and (ii) a plurality of their corresponding GT ground locations and GT main entrance door locations. More specifically, the data extraction network 200 may have applied aforementioned operations to the training images, and have generated their corresponding estimated ground locations and estimated main entrance door locations. Then, (i) each of ground pairs of each of the estimated ground locations and each of their corresponding GT ground locations and (ii) each of door pairs of each of the estimated main entrance door locations and each of the GT main entrance door locations may have been referred to, in order to generate at least one height loss and at least one door loss, by using any of loss generating algorithms, e.g., a smooth-L1 loss algorithm and a cross-entropy loss algorithm. Thereafter, by referring to the height loss and the door loss, backpropagation may have been performed to learn at least part of parameters of the data extraction network 200. Parameters of the RPN can be trained also, but a usage of the RPN is a well-known prior art, thus further explanation is omitted.

Herein, the data vectorizing layer 240 may have been implemented by using a rule-based algorithm, not a neural network algorithm. In this case, the data vectorizing layer 240 may not need to be trained, and may just be able to perform properly by using its settings inputted by a manager.

As an example, the first feature extracting layer 210, the ROI pooling layer 220 and the first outputting layer 230 may be acquired by applying a transfer learning, which is a well-known prior art, to an existing object detection network such as VGG or ResNet, etc.

Figure 51:
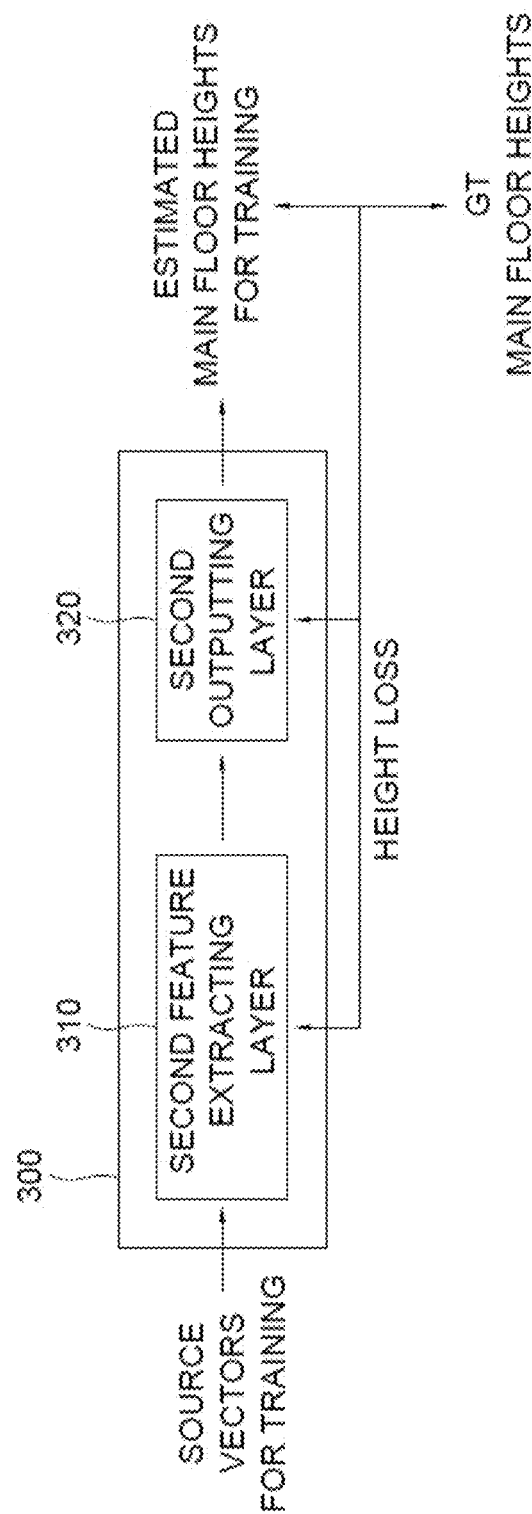
FIG. 51 is a diagram of a data analysis network according to the present disclosure.
Figure 52:
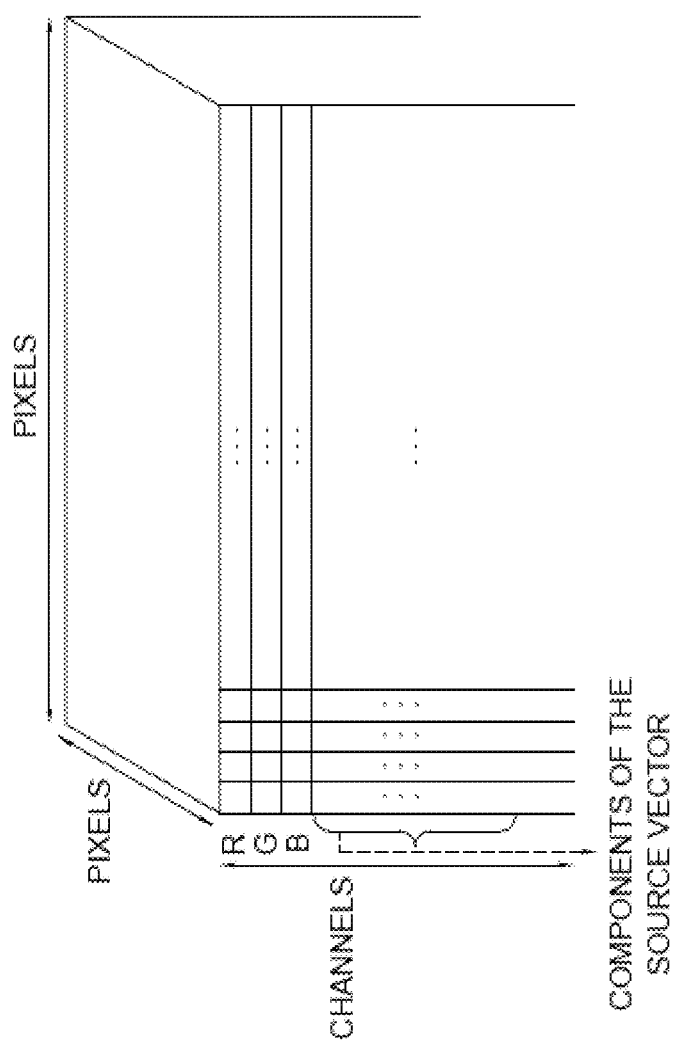
FIG. 52 is a diagram showing how components of a source vectors are arranged to correspond with image pixels according to an embodiment.

Second, by referring to FIG. 51, the data analysis network 300 may have been trained by using (i) a plurality of source vectors for training, including apparent heights for training and apparent sizes for training as their components, and (ii) a plurality of their corresponding GT main floor height. More specifically, the data analysis network 300 may have applied aforementioned operations to the source vectors for training, to thereby calculate their corresponding estimated main floor heights for training. Then each of height pairs of each of the estimated main floor heights and each of their corresponding GT main floor heights may have been referred to, in order to generate at least one height loss, by using said any of loss algorithms. Thereafter, by referring to the height loss, backpropagation can be performed to learn at least part of parameters of the data analysis network 300.

After performing such training processes, the computing device 100 can properly calculate the estimated main floor height by using the subject image including the scene photographed from the front of the subject house.

Hereafter, other embodiments will be presented.

A second embodiment is similar to the first embodiment, but different from the first embodiment in that the source vector thereof further includes a tilt angle, which is an angle between an optical axis of a camera which has been used for photographing the subject image (e.g., the subject house) and a vertical axis of the ground, as its additional essential component. Also, in order to calculate the tilt angle to be included in the source vector, the data extraction network of the second embodiment may be slightly different from that of the first one. In order to use the second embodiment, it should be assumed that information on a principal point and focal lengths of the camera are provided.

Specifically, in the second embodiment, the data extraction network 200 may have been trained to further detect lines of a road in the subject image, to thereby detect at least one vanishing point of the subject image. Herein, the lines of the road may denote lines representing boundaries of the road located on the ground in the subject image, and the vanishing point may denote where extended lines generated by extending the lines of the road, which are parallel in the real world, are gathered. As an example, through processes performed by the first feature extracting layer 210, the ROI pooling layer 220 and the first outputting layer 230, the lines of the road may be detected.

After the lines of the road are detected, the data vectorizing layer 240 may find at least one point where the most extended lines are gathered, and determine it as the vanishing point. Thereafter, the data vectorizing layer 240 may calculate the tilt angle by referring to information on the vanishing point, the principal point and the focal lengths of the camera by using a following formula:

$$\theta_{tilt} = a\tan 2(vy-cy, fy)$$

In the formula, vy may denote a y-axis coordinate of the vanishing point, cy may denote a y-axis coordinate of the principal point, and fy may denote a y-axis focal length. Using such formula to calculate the tilt angle is a well-known prior art, thus more specific explanation is omitted.

After the tilt angle is calculated, the data vectorizing layer 240 may set the tilt angle as a component of the source vector, and the data analysis network 300 may use such source vector to calculate the estimated main floor height. In this case, the data analysis network 300 may have been trained by using the source vectors for training additionally including tilt angles for training.

As a third embodiment, the source vector may further include an actual distance, which is a distance in a real world between the camera and the main entrance door, as an additional component of the source vector. For the third embodiment, it is assumed that a camera height, which is a distance between the camera and a ground directly below the camera in the real world, is provided. This embodiment is same as the second embodiment until the first outputting layer 230 generates the tilt angle. Hereinafter, processes performed after the tilt angle is generated will be explained.

The computing device 100 may instruct the data analysis network 300 to calculate the actual distance by referring to information on the camera height, the tilt angle, a coordinate of the lower boundary of the main entrance door, by using a following formula:

$$d_{actual} = \sqrt{\frac{h^2 + h^2\tan^2\left\{\frac{\pi}{2} + \theta_{tilt} - \operatorname{atan}\left(\frac{y-cy}{fy}\right)\right\}}{1 + \frac{(y-cy)^2}{fy^2}}\left(\frac{x-cx}{fx}\right)^2 + h^2\tan^2\left\{\frac{\pi}{2} + \theta_{tilt} - \operatorname{atan}\left(\frac{y-cy}{fy}\right)\right\}}$$

In the formula, x and y may denote coordinates of the lower boundary of the main entrance door, fx and fy may denote the focal lengths for each axis, cx and cy may denote coordinates of the principal point, and h may denote the camera height. A usage of such formula for calculating the actual distance is a well-known prior art, thus further explanation is omitted.

After the actual distance is calculated, the data vectorizing layer 240 may set the actual distance as the additional component of the source vector, and the data analysis network 300 may use such source vector to calculate the estimated main floor height. Also, in this case, the data analysis network 300 may have been trained by using the source vectors for training additionally including actual distances for training. Similarly, as discussed with respect to FIG. 42, with known camera height h, and known distance to the property from a street view, an elevation of the entry point (front door) of the building is directly determined by identifying the height of the front steps. Assuming the steps are vertical, the triangle shown in FIG. 42 becomes a right triangle. The distance to the steps, d, is known from above, and an angle, θ, that opposes the height of the stairs is measured from the camera image. Accordingly, the height, h, is determined as tan (θ)*d=h.

For a fourth embodiment which is mostly similar to the first one, some information acquired from a subject house DB storing information on subject houses, including the subject house, can be used for generating the source vector. That is, the computing device 100 may acquire structure information on a structure of the subject house, e.g., 3 bedrooms, 2 toilets, 1 basement, etc., from the subject house DB. Or, the computing device 100 may acquire topography information on a topography of a region around the subject house, e.g., hill, flat, mountain, etc., from the subject house DB. Herein, at least one of the structure information and the topography information can be added to the source vector by the data vectorizing layer 240, and the data analysis network 300, which has been trained by using the source vectors for training additionally including corresponding information, i.e., at least one of the structure information and the topography information, may use such source vector to calculate the estimated main floor height.

As a fifth embodiment, the source vector, generated by using any of the first to the fourth embodiments, can be concatenated channel-wise to the subject image or its corresponding subject segmented feature map, which has been generated by applying an image segmentation operation thereto, to thereby generate a concatenated source feature map, and the data analysis network 300 may use the concatenated source feature map to calculate the estimated main floor height. An example configuration of the concatenated source feature map may be shown in FIG. 52. In this case, the data analysis network 300 may have been trained by using a plurality of concatenated source feature maps for training including the source vectors for training, other than using only the source vectors for training. By using the fifth embodiment, much more information can be inputted to processes of calculating the estimated main floor height, thus it can be more accurate. Herein, if the subject image is used directly for generating the concatenated source feature map, it may require too much computing resources, thus the subject segmented feature map may be used for reducing a usage of the computing resources.

Descriptions above are explained under an assumption that the subject image has been photographed from the front of the subject house, however, embodiments stated above may be adjusted to be applied to the subject image photographed from other sides of the subject house. And such adjustment will be easy for a person in the art, referring to the descriptions.

Figure 53:
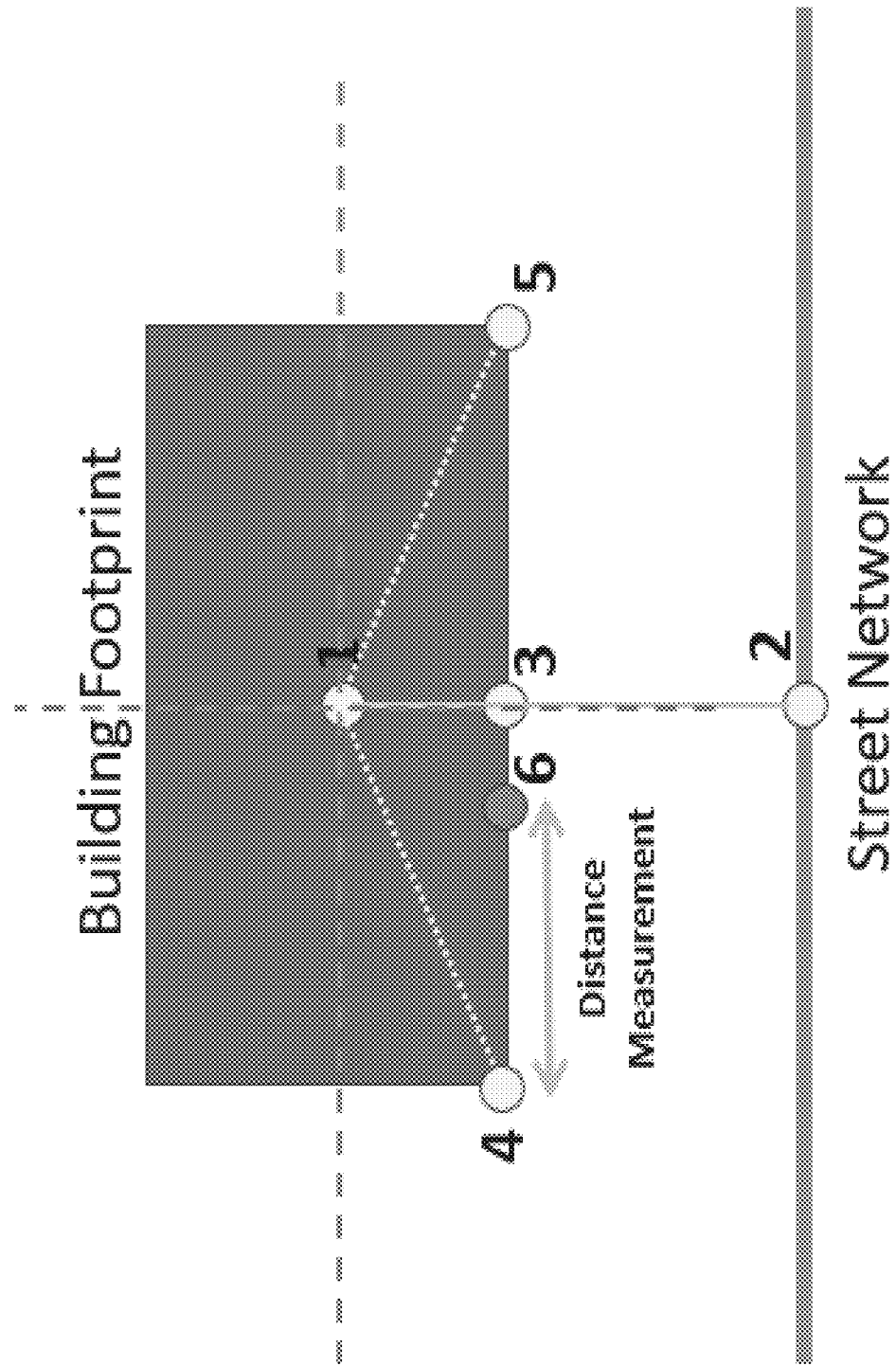
FIG. 53 is a diagram showing how to identify a property entrance based on a street facing segment of a building footprint geometry.

In reference to FIG. 53, the property entrance location (latitude and longitude) is captured based on the street facing segment of the building footprint geometries and street network geometries. The entrance location can be determined by the method presented below:

Create the centroid of the building footprint on a targeted property: Point 1

From Point 1, find the nearest point at the street network with the same street name of the property: Point 2.

Determine the intersecting point between the line from Point 1 and Point 2 and the building footprint boundary: Point 3. Point 3 is the middle point of the street-facing segment on the building footprint.

Use Point 3 and Point 1 to divide the building footprint geometry into 4 quadrants.

From Point 1, find the farthest point of the building footprint boundary in each quadrant that Point 3 is touched: Point 4 and Point 5, that would be the street-facing corners of the building. The line segment on the building footprint between Point 4 and Point 5 will be the street-facing segment.

If the distance between the entrance and a building corner is measured by using AI/imagery technology or any other method, the coordinates (Latitude, Longitude) of the entrance location can be calculated as Point 6.

The enhance location can be used to facilitate simple tape measurement or auto-measurements from smartphones with proximity sensors on the doorstep height from the ground or photo measurement in a close distance range. The measurements from the methods described above can also be used for capturing premixes between detected objects (such as entrance doors, doorsteps) and points (such as building corners) of building footprints. If the distance measurement from the property entrance and building corners are not available, the middle point (point 3 in the method described above) of the street-facing segment of building footprints can be used. Locations associated with LAG and HAG can be determined by using building footprints and digital elevation model.

Tiered accuracy rules can be developed for determining the confidence levels of different approaches as summarized in FIG. 54.

Figure 55:
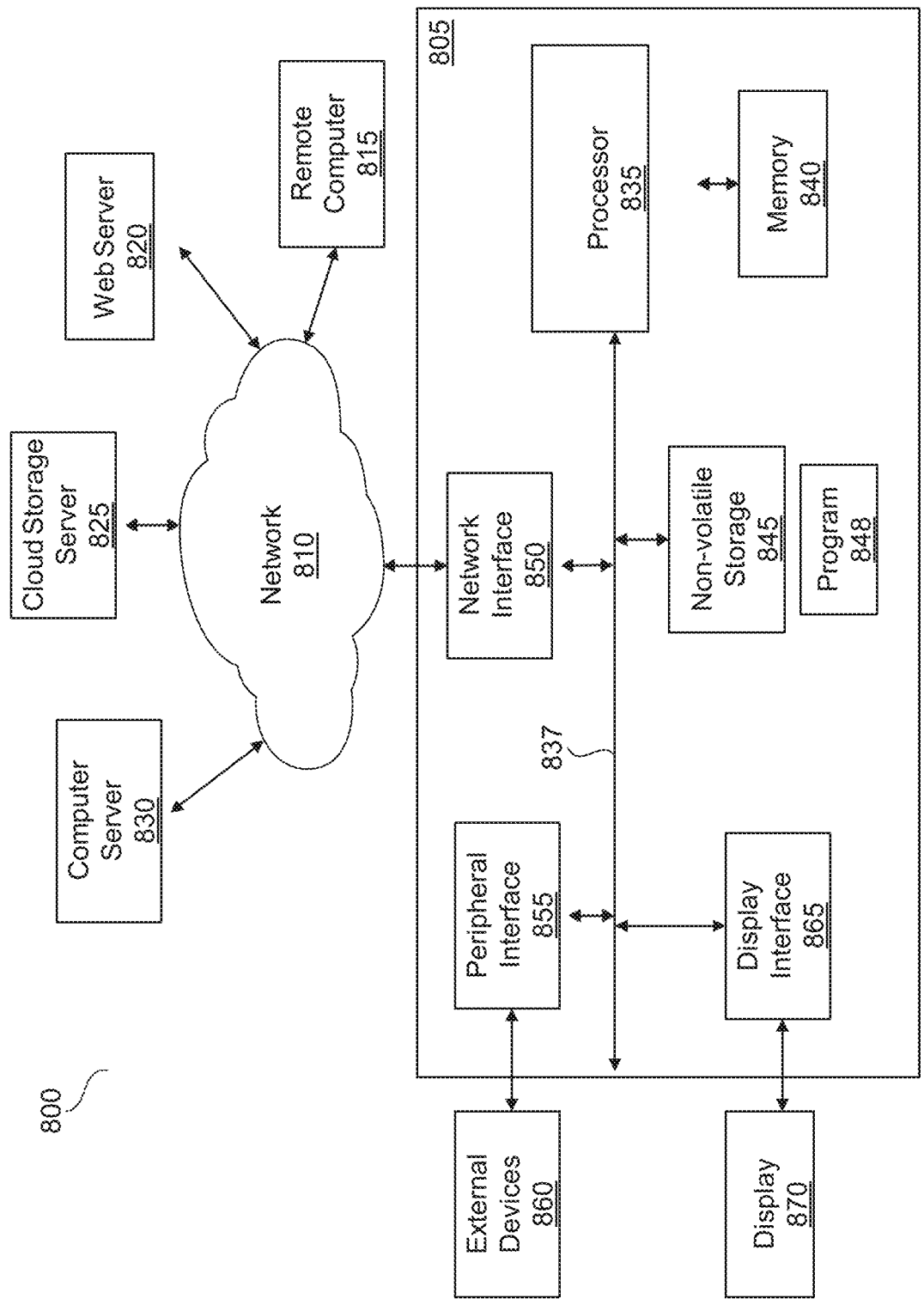
FIG. 55 is a diagram of computer circuitry according an embodiment according to the present disclosure.

The follow description involving FIG. 55 relates to the computing environment and circuitry used perform the operations discussed herein.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or compute server, or any combination of these computing devices. The remote computer or compute server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 55 is a functional block diagram illustrating a networked system 800 of one or more networked computers and servers. In an embodiment, the hardware and software environment illustrated in FIG. 55 may provide an exemplary platform for implementation of the software and/or methods according to the present disclosure.

Referring to FIG. 55, a networked system 800 may include, but is not limited to, computer 805, network 810, remote computer 815, web server 820, cloud storage server 825 and compute server 830. In some embodiments, multiple instances of one or more of the functional blocks illustrated in FIG. 55 may be employed.

Additional detail of computer 805 is shown in FIG. 55. The functional blocks illustrated within computer 805 are provided only to establish exemplary functionality and are not intended to be exhaustive. And while details are not provided for remote computer 815, web server 820, cloud storage server 825 and compute server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and compute server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and compute server 830.

Figure 56:
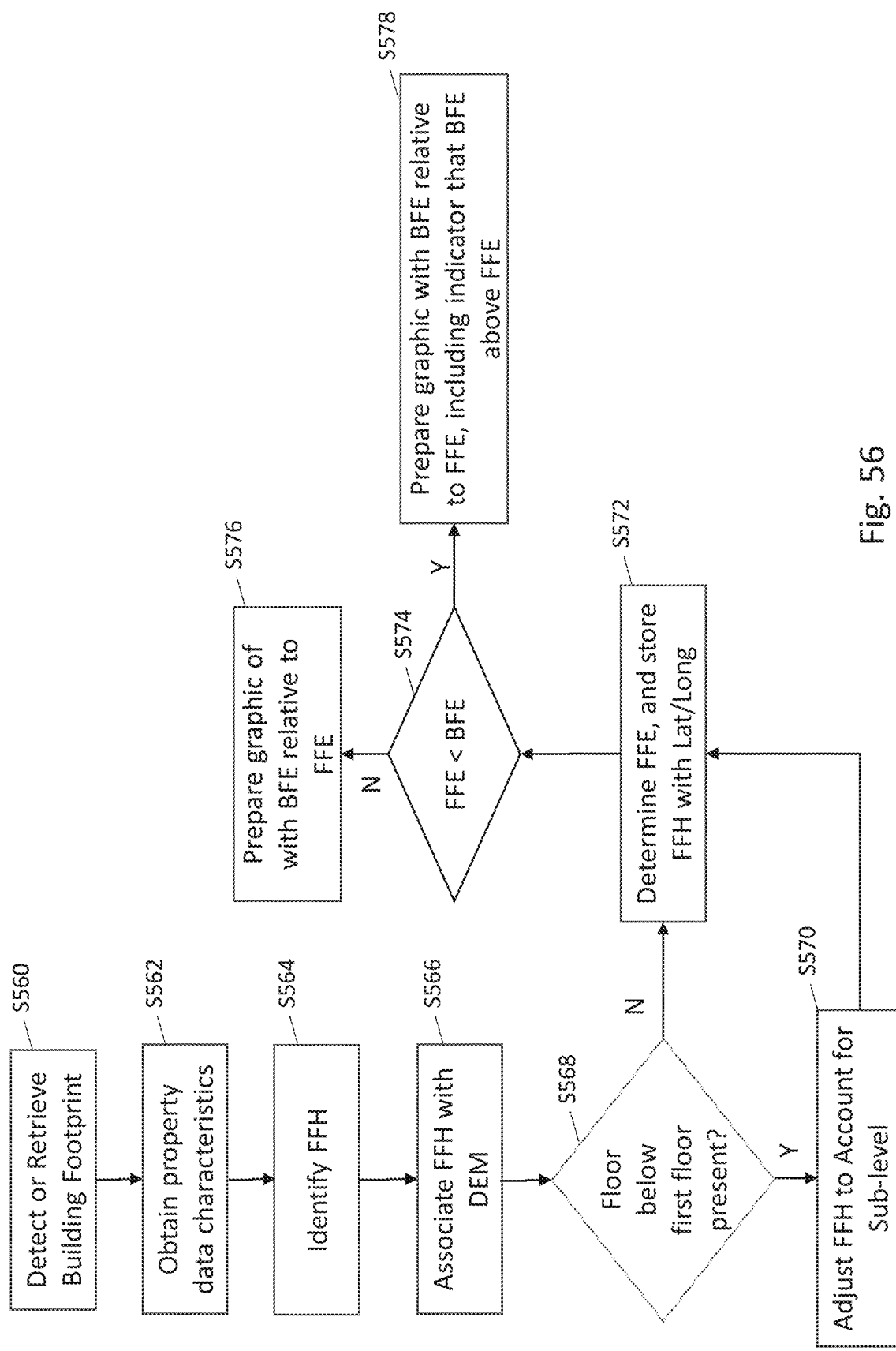
FIG. 56 is a flowchart of a process performed according to the present disclosure to fuse image processing results, and AI analysis and digital map information of terrain to identify the FFH and FFE of a house.

FIG. 56 is a flowchart of how the AI engine described in reference to FIGS. 48-52 operates. While the flowchart and AI engine have been described with respect to determining FFH, it should be understanding that other features, such as FFE, main entrance location, grade of terrain, overlap of BFE with respect to FFH/FFE, housing model (e.g., colonial, or split-level), whether there is a subfloor, crawlspace, or elevation are features that are also part of the present description. For training the AI engine, images and described herein may be used as training images and GTs to isolate the ROIs and determine the features for the parameters sought.

The process begins in step S560 where an analysis of a particular property beings. The footprint of the building on the property is retrieved, detected, or determined as discussed earlier. Other property characteristic data for the particular property is obtained in S562, using databases in 4701, and other resources in 4703 and 4705 in FIG. 47. An initial FFH is made in S564 (4707 in FIG. 47) and in step S566 adjustments are made to the FFH based on EC information, land slope, DEM and other property specific information from 4709 (FIG. 47) so the FFH is associated with the DEM for the parcel of land on which the building is located. As part of the adjustments, in step S568 a query is made regarding whether the first floor has a floor beneath it (e.g., a basement). If so, the adjustment is made to FFH to account for the sub-floor (e.g., basement) in step S570, and then process proceeds to step S572 where the data structure of FFH like that shown in 4707 (FIG. 47) is saved. However, if the response to the query in step S568 is negative, the process proceeds directly to step S572.

After the initial FFH is set, the process optionally proceeds to provide input to an end user. In the part of the process flow, the process proceeds to a query in step S574 where the FFE is compared to BFE do determine if BFE is above FFE (recognizing the FFE and FFH are directly related). If the response to the query is negative, then there is no immediate action taken because the FFH is above the base flood level, and so a graphic is prepared that shows BFE below FFE for the particular building in step S576. On the other hand, if the response to the query in affirmative, the process proceeds to step S578, where an indicator indicating that the BFE is above the FFE is included in the graphic so as to alert an end user that there is an elevated risk of flood damage for that particular property.

Figure 57B:
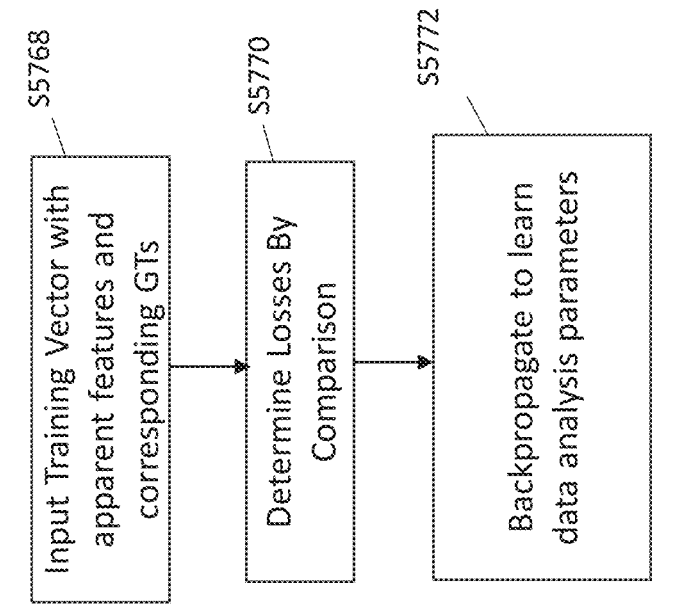
FIGS. 57A and 57B are flowcharts of processes performed for training an AI engine to detect FFH based on images of properties, and then using the AI engine for detecting FFHs based on input images of houses.
Figure 57A:
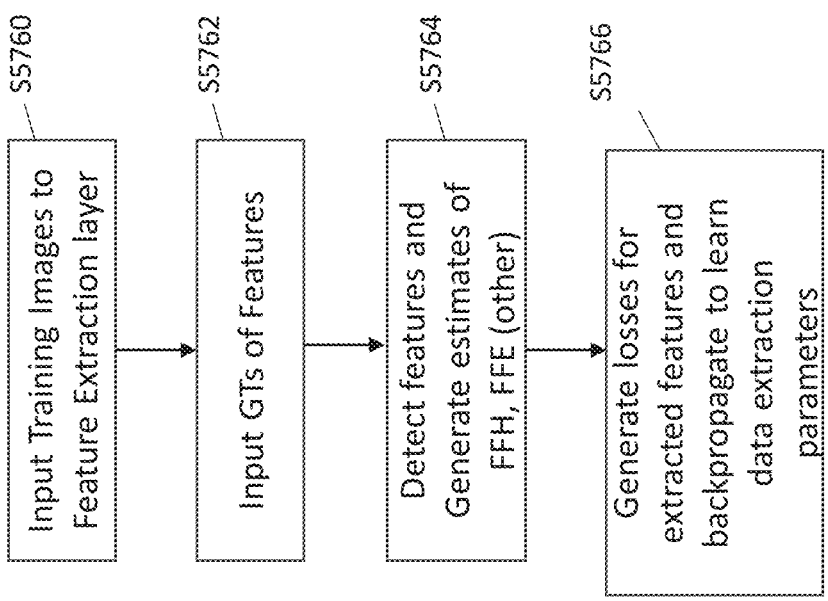

FIG. 57A is a flowchart the corresponds with the training of the data extraction network of the AI engine as previously discussed with respect to FIGS. 48-52. The process begins in step S5760 where training images (like those shown in the various figures of this document) are applied to a features extraction layer where features are detected in the images, such as the bounding boxes showing the in the figures of this document. The process then proceeds to step S5762 where ground truth (GT) images are input to the data extraction network in step S5762. Then in step S5764 estimates are generated for the detected features, and in step S5766 losses are generated for the extracted features, with respect to the GTs, and backpropagated so as to learn the data extraction parameters of the data extraction network.

FIG. 57B is a flowchart that corresponds with the training of the data analysis network of the AI engine as previously discussed with respect to FIGS. 48-52. The process begins in step S5768 where a training vector is input with respect to apparent features as well as corresponding vectors that are GTs. In step S5770 the losses for the parameters are determined by comparison, and then in step S5772 the losses are back-propagated so as to learn the data analysis parameters of the data analysis network.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

Obviously, numerous modifications and variations of the present invention are possible in light of the above teachings. It is therefore to be understood that within the scope of the appended claims, the invention may be practiced otherwise than as specifically described herein.

The invention claimed is:

1. A computer-implemented method of detecting a first floor height (FFH) of a first floor of a subject building, the method comprising:

extracting, with a computer, digital surface model (DSM) information from a database, the DSM information includes surface elevation information of the subject building on a parcel of land on which the subject building is located;

applying an overhead image of the subject building to a CNN-based AI engine implemented on the computer, which has previously been trained, so as to identify a first floor of the subject building from the image, the CNN-based AI engine having previously been trained with other images of a plurality of other buildings, the other images including overhead images of the plurality of other buildings, the CNN-based AI engine including a data extraction network having a first feature extracting layer, a region-of-interest (ROI) pooling layer, and a data vectorizing layer;

analyzing the image with the CNN-based AI engine to estimate the FFH of the subject building, the analyzing including applying by the first feature extracting layer a first convolutional operation to the image to generate a subject feature map, pooling features of the subject feature map to create a ROI-pooled feature map, the features including a roof of the subject building detected in the overhead image, identifying a roof elevation of the roof of the subject building from the DSM information, and determining an interior height differential between the roof elevation and the first floor of the subject building; and estimating the FFH of the subject building as a difference between the roof elevation and the height differential between the roof elevation and first floor, the estimating includes applying a first fully connected operation to the pooling regions of the ROI-pooled feature map.

2. The method of claim 1, wherein the other images previously applied to the CNN-based AI engine include interior images of interior spaces of the plurality of other buildings.

3. The method of claim 2, wherein the analyzing includes the CNN-based AI engine identifying regions of interest (ROIs) in the interior images of the interior spaces of the plurality of other buildings.

4. The method of claim 3, wherein the ROIs include at least one of an appliance, a countertop, or a piece of furniture.

5. The method of claim 3, wherein the ROIs includes an interior structure.

6. The method of claim 5, wherein the interior structure includes at least one of an interior staircase, an entrance, a door, or a doorstep.

7. The method of claim 1, further comprising:
extracting previously stored data from another database that includes interior property information for the subject building.

8. The method of claim 7, wherein the another database is a multiple listing service (MLS) database.

9. The method of claim 7, wherein the interior property information includes at least one of room dimensional measurements, number of floors, foundation type, property type, basement information, structure design drawing, or a 3D design model.

10. The method of claim 1, further comprising:
training the CNN-based AI engine by inputting other images as training images and ground truth images to the CNN-based AI engine, and backpropagating losses so as to establish data extraction parameters for a data extraction network portion of the CNN-based AI engine.

11. A method of detecting a first floor height (FFH) of a first floor of a subject building, the method comprising:
applying an image of the subject building to a CNN-based AI engine, implemented on a computer, which has previously been trained, so as to identify a first floor of the subject building from the image, the CNN-based AI engine having previously been trained with other images of a plurality of other buildings, the other images including at least one of a front, a side, a roof, or a back-side view of individual buildings of the plurality of other buildings, the CNN-based AI engine including a data extraction network having a first feature extracting layer, a region-of-interest (ROI) pooling layer, and a data vectorizing layer, the analyzing including;
analyzing the image with the CNN-based AI engine and determining the FFH of the subject building;
applying by the first feature extracting layer a first convolutional operation to the image to generate a subject feature map,
pooling features of the subject feature map, with the ROI pooling layer to create a ROI-pooled feature map, the features including the front of the subject building detected in the image, and
estimating the FFH of the subject building as a difference between a roof elevation and the height differential between the roof elevation and first floor, the estimating includes applying a first fully connected operation to the pooling regions of the ROI-pooled feature map;
extracting, with the computer, digital surface model (DSM) information from a database, the DSM information includes surface elevation information of the terrain and/or surface elevation information from a dataset for the parcel of land on which the subject building is located;
converting the FFH of the subject building to a first floor elevation (FFE) from the FFH and the DSM information; and
identifying a height of the subject building and the FFE of the subject building based on the height of the subject building.

12. The method of claim 11, further comprising:
obtaining information on a building footprint of the subject building; and
identifying a location at an adjacent grade point along the building footprint so as to determine an elevation of the location and the FFE of the subject building at the location.

13. The method of claim 12, wherein the obtaining includes determining a geometry of the building footprint from a perimeter of a roof line of the subject building.

14. The method of claim 11, further comprising:
training the CNN-based AI engine, the training including inputting other images as training images and ground truth images to the CNN-based AI engine, and backpropagating losses so as to establish data extraction parameters for a data extraction network portion of the CNN-based AI engine.

15. The method of claim 14, wherein the training further comprises:
training the CNN-based AI engine to detect building types including applying training images of different types of buildings to the CNN-based AI engine, the different types of buildings including basement-below grade, basement-daylight, and basement-walkout.

16. The method of claim 14, wherein the training further comprises:
training the CNN-based AI engine to detect foundation types by applying training images of buildings with different types of foundations.

17. The method of claim 14, wherein the training of the CNN-based AI engine further includes training the CNN-based AI engine with overhead images of buildings having roofs and walkways leading to the main entrance.

18. The method of claim 14, wherein the training further comprises:
training the CNN-based AI engine to estimate a height of a main entrance of the subject building, and the image being a street view image of the subject building, wherein the image includes an object detected in the image as at least one of steps and a ramp leading to the main entrance, and the height of the main entrance of the subject building is estimated from an estimated height of the objected detected in the image.

19. The method of claim 11, further comprising:
extracting previously stored data in another database that includes interior property information for the subject building.

20. The method of claim 19, wherein the interior property information includes at least one of room dimensional measurements, number of floors, foundation type, property type, basement information, structure design drawing, or a 3D design model.

* * * * *